United States Patent
Buri et al.

(10) Patent No.: US 11,261,100 B2
(45) Date of Patent: Mar. 1, 2022

(54) DRYING PROCESS

(71) Applicant: Omya International AG, Oftringen (CH)

(72) Inventors: Matthias Buri, Rothrist (CH); Catherine Jean Ridgway, Mühlethal (CH); Patrick A.C. Gane, Rothrist (CH); Samuel Rentsch, Spiegel bei Bern (CH); René Burkhalter, Herzogenbuchsee (CH); Armelle Senti-Wenk, Wettingen (CH); Martin Brunner, Wallbach (CH); Gil Morieras, Kölliken (CH); Tazio Fornera, Zofingen (CH)

(73) Assignee: Omya International AG, Oftringen (CH)

( * ) Notice: Subject to any disclaimer, the term of this patent is extended or adjusted under 35 U.S.C. 154(b) by 287 days.

(21) Appl. No.: 16/598,093

(22) Filed: Oct. 10, 2019

(65) Prior Publication Data

US 2020/0039834 A1  Feb. 6, 2020

Related U.S. Application Data

(62) Division of application No. 15/322,517, filed as application No. PCT/EP2015/064339 on Jun. 25, 2015, now Pat. No. 10,486,979.

(60) Provisional application No. 62/030,150, filed on Jul. 29, 2014.

(30) Foreign Application Priority Data

Jul. 11, 2014 (EP) .................... 14176785

(51) Int. Cl.
| | | |
|---|---|---|
| C01F 11/18 | (2006.01) | |
| C08K 3/26 | (2006.01) | |
| C08J 5/18 | (2006.01) | |
| C08K 9/04 | (2006.01) | |
| C09C 1/02 | (2006.01) | |
| D21H 19/38 | (2006.01) | |
| D21H 17/67 | (2006.01) | |
| D21H 17/69 | (2006.01) | |
| D21H 19/42 | (2006.01) | |
| C04B 20/02 | (2006.01) | |
| C04B 20/10 | (2006.01) | |
| C04B 14/28 | (2006.01) | |
| C05D 3/00 | (2006.01) | |
| C09D 7/61 | (2018.01) | |
| C09D 1/00 | (2006.01) | |
| C09C 3/08 | (2006.01) | |
| C04B 103/65 | (2006.01) | |
| C04B 111/27 | (2006.01) | |

(52) U.S. Cl.
CPC ............ *C01F 11/185* (2013.01); *C04B 14/28* (2013.01); *C04B 20/023* (2013.01); *C04B 20/107* (2013.01); *C04B 20/1033* (2013.01); *C04B 20/1051* (2013.01); *C05D 3/00* (2013.01); *C08J 5/18* (2013.01); *C08K 3/26* (2013.01); *C08K 9/04* (2013.01); *C09C 1/021* (2013.01); *C09C 3/08* (2013.01); *C09D 1/00* (2013.01); *C09D 7/61* (2018.01); *D21H 17/675* (2013.01); *D21H 17/69* (2013.01); *D21H 19/385* (2013.01); *D21H 19/42* (2013.01); *C01P 2004/61* (2013.01); *C01P 2004/62* (2013.01); *C01P 2006/12* (2013.01); *C01P 2006/14* (2013.01); *C01P 2006/82* (2013.01); *C04B 2103/65* (2013.01); *C04B 2111/27* (2013.01); *C08J 2323/00* (2013.01); *C08J 2323/06* (2013.01); *C08K 2003/265* (2013.01); *C08K 2201/003* (2013.01); *C08K 2201/006* (2013.01)

(58) Field of Classification Search
CPC . C01F 11/18; C08K 3/26; D21H 19/38; C08J 5/18
USPC ........................................... 524/322
See application file for complete search history.

(56) References Cited

U.S. PATENT DOCUMENTS

| | | |
|---|---|---|
| 4,407,986 A | 10/1983 | Nomura et al. |
| 5,989,332 A | 11/1999 | Weitzel et al. |
| 6,623,555 B1 | 9/2003 | Haverinen et al. |
| 2002/0022084 A1* | 2/2002 | Calhoun .................. C09C 1/021 427/215 |
| 2002/0102404 A1 | 8/2002 | Nakai |
| 2004/0147636 A1 | 7/2004 | Calhoun et al. |
| 2005/0004266 A1 | 1/2005 | Kayano et al. |
| 2007/0256598 A1 | 11/2007 | Blanchard et al. |
| 2009/0227721 A1 | 9/2009 | Blanchard et al. |
| 2011/0105670 A1 | 5/2011 | Gane et al. |

(Continued)

FOREIGN PATENT DOCUMENTS

| | | |
|---|---|---|
| EP | 0894833 A2 | 2/1999 |
| EP | 2143688 A1 | 1/2010 |

(Continued)

OTHER PUBLICATIONS

International Search Report in International Application No. PCT/EP2015/064339, dated Sep. 28, 2015.

(Continued)

*Primary Examiner* — Deve V Hall
(74) *Attorney, Agent, or Firm* — Heslin Rothenberg Farley & Mesiti P.C.

(57) ABSTRACT

The present invention refers to a process for making a calcium carbonate containing material, wherein the process includes a specific drying procedure and allows for the provision of calcium carbonate materials with reduced moisture pick-up and low porosity.

24 Claims, 2 Drawing Sheets

(56) References Cited

U.S. PATENT DOCUMENTS

| | | | |
|---|---|---|---|
| 2011/0245396 A1 | 10/2011 | Blanchard et al. | |
| 2012/0264867 A1 | 10/2012 | Gane et al. | |
| 2013/0217819 A1* | 8/2013 | Buri | C09C 1/021 524/322 |
| 2014/0000485 A1 | 1/2014 | Smith et al. | |

FOREIGN PATENT DOCUMENTS

| | | |
|---|---|---|
| EP | 2447213 A1 | 10/2010 |
| EP | 2524898 A1 | 11/2010 |
| EP | 2371766 A1 | 10/2011 |
| EP | 2447328 A1 | 5/2012 |
| EP | 2722368 A1 | 4/2014 |
| WO | 9961521 A1 | 12/1999 |
| WO | 0020336 A1 | 4/2000 |
| WO | 0039029 A2 | 7/2000 |
| WO | 2004016566 A1 | 2/2004 |
| WO | 2004026973 A1 | 4/2004 |
| WO | 2014060286 A1 | 4/2014 |

OTHER PUBLICATIONS

Written Opinion of International Searching Authority in International Application No. PCT/EP2015/064339, dated Sep. 28, 2015.
Dominguez et al. "A Technical and Economic Study of a Plant to Produce Precipitated Calcium Carbonate Used in the Polymer Industry," Thesis to Obtain the Title of Petrochemical Engineer, National University of Engineering, Lima, Peru, 212 pages. 1980.
Examination Report in Australian Patent Application No. 2015287011, dated May 18, 2017.
Notice of Acceptance in Australian Patent Application No. 2015287011, dated Jun. 28, 2017.
Office Action in Canadian Patent Application No. 2,953,879, dated Oct. 26, 2017.
Office Action in Chinese Patent Application No. 201580037771.0, dated Jan. 12, 2018.
Office Action in Colombian Patent Application No. NC2017/0000258, dated Apr. 12, 2018.
European Search Report in European Application No. 14176785.5, dated Dec. 22, 2014.
Office Action in Korean Patent Application No. 10-2017-7003762, dated Mar. 12, 2018.
Search Report in Russian Patent Application No. 2017103459, dated Mar. 22, 2018.
Office Action in Russian Patent Application No. 2017103459, dated Mar. 26, 2018.
Office Action in Taiwan Patent Application No. 104120697, dated May 2, 2016.
International Preliminary Report on Patentability in International Application No. PCT/EP2015/064339, dated Jan. 26, 2017.
Office Action in European Application No. 14176785.5, dated Oct. 5, 2016.
Respose to Office Action dated Oct. 5, 2016 in European Application No. 14176785.5, dated Feb. 2, 2017.
Office Action in European Application No. 14176785.5, dated Jul. 21, 2016.
Office Action in European Application No. 14176785.5, dated Mar. 15, 2017.
Response to Office Action dated Mar. 15, 2017 in European Application No. 14176785.5, dated Sep. 20, 2017.
Respose to Office Action dated May 29, 2017 in European Application No. 14176785.5, dated Oct. 5, 2017.
Office Action in European Application No. 14176785.5, dated Jan. 16, 2018.
Response to Office Action dated Jan. 16, 2018 in European Application No. 14176785.5, dated Feb. 28, 2018.
New Claims in Response to Office Action dated Jan. 16, 2018 in European Application No. 14176785.5, dated Feb. 28, 2018.
Decision to Grant in European Application No. 14176785.5, dated Oct. 5, 2018.

* cited by examiner

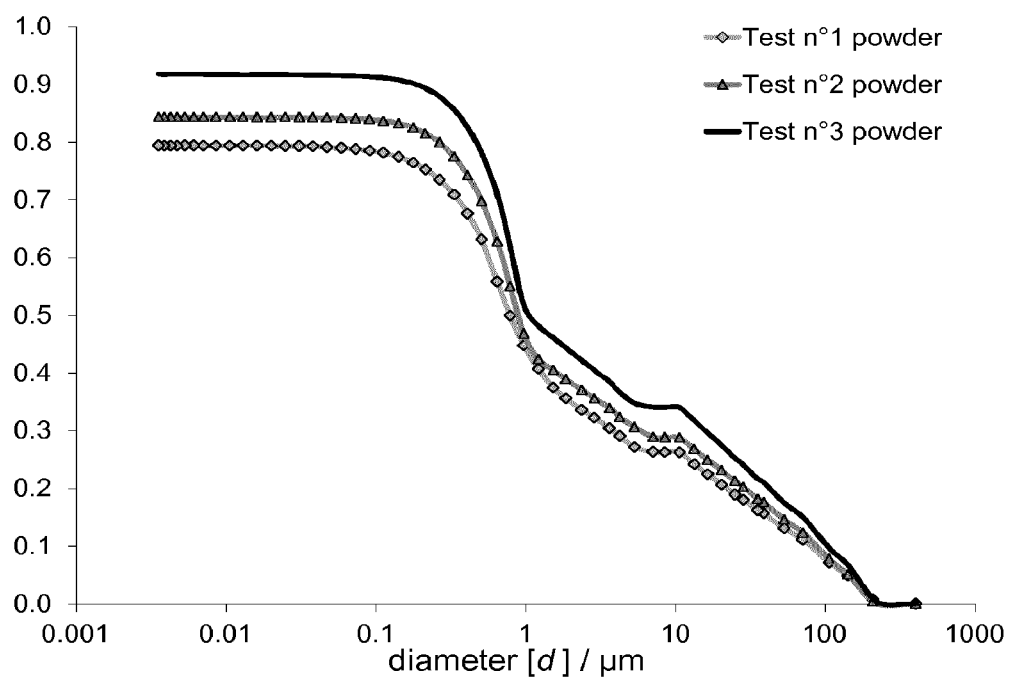
Figure 1 – Total pore volume

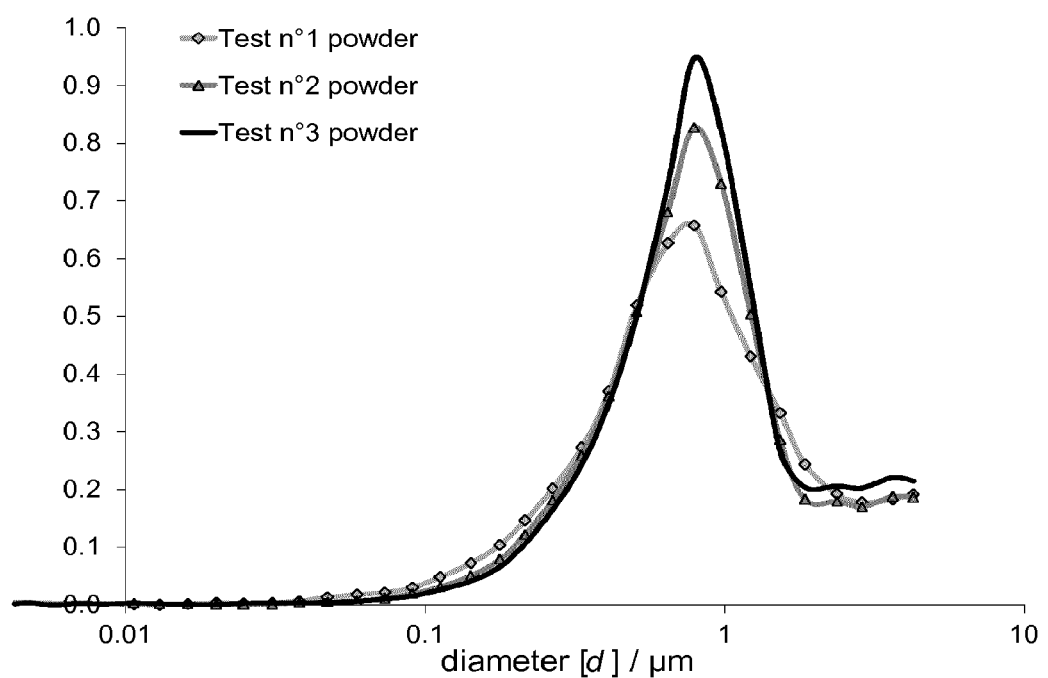
Figure 2 – Pore volume distribution

DRYING PROCESS

CROSS REFERENCE TO RELATED APPLICATIONS

This application is a divisional of U.S. patent application Ser. No. 15/322,517 filed Dec. 28, 2016, which is a 371 National Phase of International Application No. PCT/EP2015/064339 filed Jun. 25, 2015, which claims priority to U.S. Provisional Application No. 62/030,150 filed Jul. 29, 2014 and European Application No. 14176785.5 filed Jul. 11, 2014. The above applications are incorporated herein by reference in their entirety.

The present invention relates to a process for making a calcium carbonate containing material which involves a specific drying procedure. The resulting mineral filler may be used, for example, in polymer compositions, in paper making, paper coatings, agricultural applications, paints, adhesives, sealants, construction applications, or cosmetic applications.

Well known mineral fillers are, for example, natural ground calcium carbonate (GCC) and precipitated calcium carbonate (PCC).

Several attempts have been made to improve the applicability of particulate mineral materials and especially calcium carbonate-containing mineral fillers. In this context, especially the residual moisture within the filler material and the moisture pick-up properties often are crucial. The residual moisture within the filler material and the moisture pick-up properties obviously depend on the drying process, but also on e.g. possible surface treatments. Exemplarily, reference is made to EP 0 998 522 which suggests to dry particulate calcium carbonate material. It is suggested in this prior art document that a reduced moisture level and a low susceptibility to pick up surface moisture in calcium carbonate materials improves the quality of the filler. More precisely, it is set out that a moisture content above a minimum level associated with the carbonate mineral filler used in the composition for manufacturing a polymer film product can result in unwanted macroscopic size voids or holes in the film formed as a result of steam generation whilst the thermoplastic polymer of the film is in the plastic melt phase. The drying according to EP 0 998 522 may be carried out in a single step or in at least two steps, e.g. by applying a first heating step to the carbonate to enable the adhered moisture content to be reduced and applying at least a second heating step to the carbonate to reduce the surface moisture content thereof to 0.10% by weight or less. The carbonate according to EP 0 998 522 is to be surface coated with a hydrophobizing surface treatment agent and the second heating step may be applied before and/or during the surface treatment step.

Also in WO 00/39029, WO 2004/026973, EP 0 894 833 and EP 2 143 688 different methods for dewatering slurries by thermal or mechanical means are described. WO 00/39029 describes a method of producing a rheologically stable concentrated aqueous suspension of a particulate alkaline earth metal carbonate. WO 2004/026973 refers to a method of grinding an inorganic particulate material such as calcium carbonate or kaolin in an aqueous suspension, preferably at a solids level below about 50% by weight, wherein the aqueous suspension includes a sub-effective amount of a dispersing agent for the inorganic particulate material. EP 0 894 833 describes a method for making a dry product of agglomerated pigment containing carbonate. EP 2 143 688 describes the preparation of an aqueous suspension of natural calcium carbonate.

Hydrophobizing surface treatments of calcium carbonate materials for use in e.g. plastic materials are well known in the art. Exemplarily, reference is made to WO 00/20336 relating to an ultrafine natural calcium carbonate which may optionally be treated with one or more fatty acids or one or more salts, or mixtures thereof.

Likewise, U.S. Pat. No. 4,407,986 relates to a precipitated calcium carbonate that is surface-treated with a dispersant that may include higher aliphatic acids and their metal salts in order to limit the addition of lubricant additives when kneading this calcium carbonate with crystalline polypropylene and to avoid the formation of calcium carbonate aggregates that limit the impact strength of the polypropylene.

Moreover, particulate mineral materials may also be treated with other surface-treatment agents, such as silanes, siloxanes, phosphates, phosphonates, oxalates, succinates, fluorides, natural or unnatural polymers, or mixtures thereof in order to hydrophobize the surface of said mineral material.

However, in many cases, the preparation of calcium carbonate-containing mineral filler products by using the conventional thermal drying techniques as described in the art does not lead to mineral products having the desired quality, especially in terms of water pick up susceptibility and residual moisture. Such materials may pick up moisture during storage, transportation, and/or processing which, in turn, may lead to the formation of voids in polymer compositions produced in e.g. a melt extrusion process. Furthermore, the dried filler materials are usually prepared by thermal treatment of corresponding calcium carbonate containing slurries having relatively low solids content. Obviously, the thermal drying of compositions having high water content is very energy consuming.

Furthermore, it is observed that for many applications and especially for paper applications the porosity of particulate calcium carbonate materials may have a significant influence. An increased or higher porosity is usually associated with lower print density and print gloss. A lower porosity may lead to an increased gloss and smoothness. Furthermore, it is postulated that moisture contained in a porous coating is detrimental to light scattering and thus the attainable brightness and/or opacity of the coating layer may be affected.

In view of the foregoing, there is still a need to provide mineral filler products and processes for their preparation which may reduce or avoid one or more of the aforementioned technical drawbacks. Especially, there is still a need for the provision of new efficient processes for making a calcium carbonate containing materials or fillers which have a low water pick up susceptibility and residual moisture. Furthermore, it would be desirable to provide a more energy efficient process. Additionally, it would be desirable to provide mineral filler products and processes for their preparation which have a lower porosity or low pore volume.

It is thus an object of the present invention to provide a process for making a calcium carbonate containing material which can be processed into a material having a low water pick up susceptibility and residual moisture. Another object may also be seen in the provision of a highly efficient process for the provision of a mineral filler product.

One or more of the foregoing and other problems are solved by the subject-matter as defined herein in the independent claims.

According to a first aspect, a process for making a calcium carbonate containing material is provided which comprises the following steps:
- a) providing a particulate moist calcium carbonate containing material, said material
  - i) having a moisture content of more than 65 wt.-%, based on the weight of the moist calcium carbonate containing material, and
  - ii) containing no dispersant or containing a sub-effective amount of dispersant;
- b) reducing the moisture content of the moist calcium carbonate containing material of step a), thereby removing a part of the water soluble matter present in the particulate moist calcium carbonate containing material, wherein the moisture is removed with mechanical means at a temperature in the range of more than 0° C. to 65° C. in one or more steps by at least 10% and in any case to a reduced moisture content of less than 65 wt.-%, based on the weight of the moist calcium carbonate containing material;
- c) thermally concentrating the moist calcium carbonate containing material with the reduced moisture content of step b) at a temperature in the range of −100° C. to 100° C. until a final moisture content of not more than 1.0 wt.-%, based on the weight of the calcium carbonate containing material.

The inventors surprisingly found that the two step drying procedure as specified herein provides several unexpected advantages. The procedure involves the removal of moisture with mechanical means to a reduced moisture content of less than 65 weight percent and a subsequent thermal drying step. The products obtained by the foregoing inventive two-step procedure provide different and superior properties in comparison to corresponding calcium carbonate filler materials being dried with a conventional method (thermal drying of the corresponding low solid suspension in one or more steps only).

Without wishing to be bound to any theory, it is assumed that the ions or the water soluble matter being contained in the calcium carbonate suspension influence the properties of the final product and especially of the surface properties of the dried product. More precisely, it is assumed that upon concentrating the aqueous phase of the suspension, i.e. during drying, said ions and water-soluble matter aggregate at the surface of the mineral particles and/or influence the crystallization process which takes place during drying and/or influence or support the formation of chemical bridges. One of such reactions could be the decomposition of calcium hydrogen carbonate as shown in Equation 1

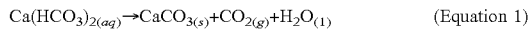

$$Ca(HCO_3)_{2(aq)} \rightarrow CaCO_{3(s)} + CO_{2(g)} + H_2O_{(1)} \qquad \text{(Equation 1)}$$

As this reaction is temperature dependent, step b) should be carried out at a temperature of not more than 65° C. and preferably at a temperature of not more than 60° C. The foregoing processes and chemical reactions also influence the porosity and/or the compressibility of the resulting calcium carbonate material.

Considering the foregoing, it becomes clear that step b) of the inventive drying process relates to the adjustment of the concentration of ions and water-soluble matter in the suspension to be dried. Obviously, the thermal drying of a suspension without removing part of the aqueous phase would lead to a concentrating of the "complete" amount of ions and water soluble matter and, thus, to another or different product. According to the inventive process, it is necessary to remove a minimum specified part of the moisture content of the moist calcium carbonate containing starting material having a moisture content of more than 65 wt.-%, thereby removing a part of the water soluble matter present in the particulate moist calcium carbonate containing material. The removal according to the inventive process is carried out at a temperature in the range of more than 0° C. to 65° C., preferably at a temperature in the range of more than 0° C. to 60° C., and requires a moisture reduction by at least 10% (based on the weight of the moist phase or water) and in any case a moisture reduction to a moisture content of less than 65 wt.-%, based on the weight of the moist calcium carbonate containing material. This means that the moisture content in step b) in any case has to be reduced by at least 10% (e.g. from 66 wt.-% to 60 wt.-%) and in any case to a moisture content of less than 65 wt.-%. Consequently, neither a moisture reduction from e.g. 66 wt.-% to 64 wt.-% (no 10% decrease) would be covered by the inventive process, nor a reduction from e.g. 75 wt.-% to 66 wt.-% (minimum amount of 65 wt.-% not reached). The resulting, still moist calcium carbonate material contains a significantly reduced amount of ions and water soluble matter and is thermally dried according to the inventive process until a final moisture content of not more than 1.0 wt.-%, based on the weight of the moist calcium carbonate containing material. The calcium carbonate material thus obtained has a reduced porosity in comparison to a product being thermally dried without an antecedent mechanical separation step. It is assumed that the surface of the calcium carbonate material obtainable by the inventive process is smoother due to less surface reaction products or surface modifications and, thus, there is less "friction" between the particles leading to a lower porosity of the particulate material.

According to another aspect of the present invention, a calcium carbonate containing material is provided. Said material is obtainable by the inventive process. It is especially preferred that said material is treated with a hydrophobizing agent. The advantageous material properties obtained by the inventive process become especially evident from the corresponding hydrophobically treated material which shows excellent low moisture pick-up susceptibility and has very low residual moisture.

Another aspect of the present invention relates to a calcium carbonate containing particulate material having a weight median particle size $d_{50}$ value in the range of 0.9 to 2.0 μm, wherein the calcium carbonate containing material has a moisture sorption susceptibility of less than 0.8 mg/g after treatment with a hydrophobizing agent and has a total specific pore volume of less than 0.84 cm³/g before treatment with said hydrophobizing agent. The specific pore volume according to the present invention is measured in powder form as described hereinafter.

Yet another aspect of the present invention relates to a calcium carbonate containing particulate material having a weight median particle size $d_{50}$ value in the range of 0.9 to 2.0 μm, wherein the calcium carbonate containing material has a moisture sorption susceptibility of less than 0.8 mg/g after treatment with a hydrophobizing agent and has a total specific pore volume of less than 0.47 cm³/g in the pore diameter range of 0.004 to 2.4 μm before treatment with said hydrophobizing agent.

Further aspects of the present invention relate to a paper containing the inventive calcium carbonate containing material, to a thermoplastic polymer material comprising the inventive calcium carbonate containing material and to a thermosetting polymer material comprising the inventive calcium carbonate containing material. The aforementioned properties of the inventive calcium carbonate material, especially the low moisture pick up properties and the low moisture content render these materials as excellent fillers for plastic materials where moisture may have detrimental effects during processing. The inventive calcium carbonate containing material being treated or coated with a hydrophobizing agent is especially suitable as a filler in breathable film applications due to its low moisture pick-up susceptibility.

Further aspects of the present invention relate to the use of a calcium carbonate containing particulate material according to the present invention as a filler in the manufacture of a polymer product, preferably a polymer product being selected from a masterbatch, a fibre, preferably a staple fibre or carpet fibre, a filament, a thread, a woven material, a nonwoven material, a film, preferably a blown-film or a breathable film, a profile, a cable and a moulded product. The present invention also relates to a corresponding polymer product comprising a calcium carbonate containing particulate material according to the present invention as well as at least one polymeric material, wherein the product is a masterbatch, a fibre, preferably a staple fibre or carpet fibre, a filament, a thread, a woven material, a nonwoven material, a film, preferably a blown-film or a breathable film, a profile, a cable, or a moulded product.

Another aspect of the present invention relates to a process for producing a polymer product, wherein a calcium carbonate containing particulate material according to the present invention is added to at least one polymer, said at least one polymer preferably being selected from at least one thermoplastic polymer. According to a preferred embodiment of this process, the at least one thermoplastic polymer is selected from the group consisting of homopolymers and/or copolymers of polyolefins, polyamides, polystyrenes, polyacrylates, polyvinyls, polyurethanes, halogen-containing polymers, polyesters, polycarbonates, and mixtures thereof.

According to yet another aspect, the inventive process is used for the production of a polymer product, especially a breathable film, containing a hydrophobically treated calcium carbonate containing particulate material according to the present invention as a filler.

Furthermore, the aforementioned properties of the inventive calcium carbonate material, especially the low porosity render these materials as excellent fillers for paper applications where a high porosity may have detrimental effects, like lower print density and print gloss. A reduced porosity as observed for the inventive calcium carbonate material is known to increase gloss, smoothness and print gloss.

It should be understood that for the purposes of the present invention, the following terms have the following meanings:

Unless specified otherwise, the terms "drying" and "dried" refer to a process according to which at least a portion of water is removed such that a constant weight at 120° C. is reached. Moreover, a "dried" material may be further defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

The term "moisture content" in the meaning of the present invention equates with the term "water content", i.e. is not meant to specify e.g. condensed water or diffused water vapour.

The "total moisture content" of a material refers to the percentage of moisture (i.e. water) which may be desorbed from a sample upon heating to 220° C. The exact procedure for measuring the total moisture content is described hereinafter.

A "natural calcium carbonate source" may be any natural material comprising calcium carbonate. Such materials comprise, for example, marble, limestone, chalk, dolomite, and the like.

The "moisture pick up susceptibility" or "moisture sorption susceptibility" of a material refers to the amount of moisture absorbed on the surface of said material within a certain time upon exposure to a defined humid atmosphere and is expressed in mg/g. The moisture pick up susceptibility of a material according to the present invention may be determined in mg moisture/g after exposure to an atmosphere of 10 and 85% relative humidity, respectively, for 2.5 hours at a temperature of +23° C. (±2° C.). For this purpose, the sample is first kept at an atmosphere of 10% relative humidity for 2.5 hours, then the atmosphere is changed to 85% relative humidity at which the sample is kept for another 2.5 hours. The weight increase between 10 and 85% relative humidity is then used to calculate the moisture pick-up in mg moisture/g of sample. The moisture pick up susceptibility in mg/g divided by the specific surface area in $m^2/g$ (BET method) corresponds to the "normalized moisture pick up susceptibility" expressed in $mg/m^2$ of sample.

The term "volatile onset temperature" in the meaning of the present application refers to a temperature at which volatiles—including volatiles introduced as a result of the present process—begin to evolve, as observed on a thermogravimetric (TGA) curve, plotting the mass of remaining sample (y-axis) as a function of temperature (x-axis), the preparation and interpretation of such a curve being defined hereafter in the experimental part.

Throughout the present application, the particle size of a fraction of a particulate material is described by its particle size distribution. The value $d_x$ represents the diameter relative to which x % by weight of the particles have diameters less than $d_x$. This means, for example, that the $d_{98}$ value (also referred to as the "topcut") is the particle size at which 98 wt.-% of all particles of a fraction are smaller than the indicated value. The $d_{50}$ value is thus the "weight median particle size" at which 50 wt.-% of all particles are smaller than the indicated particle size.

The term "filler" in the meaning of the present invention refers to substances which may be added to materials, such as polymers, elastomers, paints, or adhesives, e.g. to lower the consumption of more expensive materials or to improve material or mechanical properties of the resulting products. The person skilled in the art very well knows the fillers, typically mineral fillers, used in the respective field.

Unless specified otherwise, the term "porosity" or "specific pore volume" according to the present invention relates to the total or cumulative porosity or pore volume of the calcium carbonate containing material in untreated (no hydrophobic coating) form as measured with mercury intrusion porosimetry.

The term "volume defined pore size polydispersity" is to be understood as a characteristic describing the breadth of distribution of pore size diameters (in μm) to be found between the pigment particles. For the purpose of the present invention the volume defined pore size polydispersity is expressed as full width at half maximum of the single pore size distribution peak. A "full width at half maximum (FWHM)" is an expression of the extent of a function, given by the difference between the two extreme values of the independent variable at which the dependent variable is equal to half of its maximum value. The technical term "full width at half maximum", or FWHM, is used to approximate the diameter distribution in respect to pore volume proportion of the majority of the pores, i.e. the polydispersity of the pore sizes distributed across the pore volume occupancy. In the present invention, "the full width at half maximum height" (FWHM) refers to the log-normal represented pore size distribution.

The term "fibre" in the meaning of the present invention refers to a linear structure forming textile fabrics such as wovens or nonwovens, which typically consist of fibre webs bonded together by e.g. mechanical methods. Accordingly, the term "fibre" is understood to refer to a finite structure.

The term "thread" in the meaning of the present invention refers to a linear structure forming textile fabrics such as nonwovens which typically consist of thread webs bonded together by e.g. mechanical methods. Accordingly, the term "thread" is understood to refer to a finite structure. The thread may be constructed as mono-, bi- or multi-thread. If a bi- or multi-thread is present, the composition of the single thread may be substantially the same. That is to say, the compositions of the single threads comprise substantially the same components in the same amounts. Alternatively, the composition of the single threads may be different. That is to say, the compositions of the single threads may comprise the same components in varying amounts or the compositions of the single threads may comprise different components in the same amounts or the composition of the single threads may comprise different components in varying amounts.

The term "filament" in the meaning of the present invention refers to a structure that differs from fibres by its structure length. Accordingly, the term "filament" is understood to refer to endless fibres. It is further appreciated that the filament may be constructed as mono-, bi- or multi-filament. If a bi- or multi-filament is present, the composition of the single filaments may be substantially the same. That is to say, the compositions of the single filaments comprise substantially the same components in the same amounts. Alternatively, the composition of the single filaments may be different. That is to say, the compositions of the single filaments may comprise the same components in varying amounts or the compositions of the single filaments may comprise different components in the same amounts or the composition of the single filaments may comprise different components in varying amounts.

The cross-section of the filaments and/or fibres and/or threads may have a great variety of shapes. It is preferred that the cross-sectional shape of the filaments and/or fibres and/or threads may be round, oval or n-gonal, wherein n is ≥3, e.g. n is 3. For example, the cross-sectional shape of the filaments and/or fibres and/or threads is round, approximately round or trilobal. Additionally or alternatively, the cross-sectional shape of the filaments and/or fibres and/or threads can be hollow.

As used herein, the term "textile article" refers to a product produced by methods such as by layering, plaiting, braiding, knotting, weaving, knitting, crocheting, or tufting.

For the purpose of the present invention, the term "woven material" refers to a textile article or fabric produced by weaving, and, the term "nonwoven material" refers to a flat, flexible, porous sheet structure that is produced by interlocking layers or networks of fibres, filaments, or film-like filamentary structures.

A "film" in the meaning of the present invention is a sheet or layer of material having a median thickness which is small compared to its length and width. For example, the term "film" may refer to a sheet or layer of material having a median thickness of less than 200 µm, but more than 1 µm.

According to one preferred embodiment of the present invention, the film is a breathable film. The term "breathable film" in the meaning of the present invention refers to a polymer film that allows the passage of gases and moisture vapour, for example, due to the presence of micropores. The "breathability" of a breathable film can be measured by its water vapour transmission rate (WVTR), which is specified in $g/(m^2 \cdot day)$. For example, a polymer film may considered as being "breathable" if it has a WVTR of at least 1000 $g/(m^2 \cdot day)$. The WVTR may be determined with a Lyssy L80-5000 measuring device according to ASTM E398.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, e.g., means that, unless the context clearly dictates otherwise, the term "obtained" does not mean to indicate that, e.g., an embodiment must be obtained by, e.g., the sequence of steps following the term "obtained" though such a limited understanding is always included by the terms "obtained" or "defined" as a preferred embodiment.

In the following, preferred embodiments of the inventive process for making a calcium carbonate containing material will be discussed in more detail. It is to be understood that these details and embodiments also apply to the calcium carbonate containing material itself as well as to the use of said product in any of the disclosed applications.

According to one embodiment of the invention, the moist calcium carbonate containing material of step a) has a moisture content of more than 70 wt.-%, preferably of more than 75 wt.-% and more preferably of more than 80 wt.-%, based on the weight of the moist calcium carbonate containing material.

According to another preferred embodiment of the invention, the moisture content of the moist calcium carbonate containing material in step b) is lowered to a reduced moisture content of less than 60 wt.-%, based on the weight of the moist calcium carbonate containing material, preferably of less than 50 wt.-%, more preferably of less than 40 wt.-% and even more preferably of less than 30 wt.-%, based on the weight of the moist calcium carbonate containing material.

In some embodiments of the inventive process, the moist calcium carbonate containing material of step a) has a moisture content of more than 70 wt.-% and is lowered in step b) to a reduced moisture content of less than 60 wt.-%, based on the weight of the moist calcium carbonate containing material, preferably of less than 50 wt.-%, more preferably of less than 40 wt.-% and even more preferably of less than 30 wt.-%, based on the weight of the moist calcium carbonate containing material. In some embodiments of the inventive process, the moist calcium carbonate containing material of step a) has a moisture content of more than 75 wt.-% and is lowered in step b) to a reduced moisture content of less than 60 wt.-%, based on the weight of the moist calcium carbonate containing material, preferably of less than 50 wt.-%, more preferably of less than 40 wt.-% and even more preferably of less than 30 wt.-%, based on the weight of the moist calcium carbonate containing material. In some embodiments of the inventive process, the moist calcium carbonate containing material of step a) has a moisture content of more than 80 wt.-% and is lowered in step b) to a reduced moisture content of less than 60 wt.-%, based on the weight of the moist calcium carbonate containing material, preferably of less than 50 wt.-%, more preferably of less than 40 wt.-% and even more preferably of less than 30 wt.-%, based on the weight of the moist calcium carbonate containing material. It may be preferred according to the present invention that the moisture content of the moist calcium carbonate containing material in step b) is lowered by mechanical means in one or more steps by at least 30%, preferably by at least 50%, more preferably by at least 60% and most preferably by at least 70%.

According to one embodiment of the invention, the moist calcium carbonate containing material is thermally concentrated in step c) until a final moisture content of not more than 0.5 wt.-%, more preferably of not more than 0.2 wt.-%, even more preferably of not more than 0.1 wt.-% and most preferred by not more than 0.07 wt.-%, based on the weight of the moist calcium carbonate containing material.

According to another preferred embodiment of the invention, the particulate moist calcium carbonate containing material of step a) is selected from the group consisting of wet ground calcium carbonate material, dry ground and wetted calcium carbonate material, precipitated calcium carbonate (PCC) material or a mixture of the foregoing calcium carbonate materials. Furthermore, it has been found according to the present invention that it may be advantageous if the calcium carbonate containing material obtained after step b) (concentration with mechanical means) is washed one or more times with deionised water prior to the thermal drying step c). The washing may be accomplished by diluting the calcium carbonate containing material obtained after step b) with deionised water and removing the added amount of water again with mechanical means. This step may be carried out one time or two or more times.

It is especially preferred according to the present invention that the calcium carbonate containing material obtained in step c) is treated with a hydrophobizing agent, preferably with a hydrophobizing agent selected from the group of mono- and/or dicarboxylic acids having from 6 to 24 chain carbon atoms, more preferably with at least one fatty acid selected from the group of stearic acid, behenic acid, palmitic acid, isostearic acid, montanic acid, capric acid, lauric acid, myristic acid and mixtures thereof and most preferably with caprylic acid and/or salts thereof. The treatment with the hydrophobizing agent is preferably carried out at elevated temperature such that the hydrophobizing agent is in the liquid or molten state and preferably is carried out at a temperature of at least 50° C., more preferably of at least 75° C., even more preferably of between 50° C. and 200° C. and most preferably of between 70° C. and 110° C. It is contemplated according to the present invention that the treatment with the hydrophobizing agent preferably is carried out before, during and/or after de-agglomeration of the calcium carbonate containing material, most preferably during de-agglomeration. It may also be preferred to carry out two de-agglomeration steps, preferably prior and after the hydrophobic treatment.

According to another embodiment of the present invention, the treatment with the hydrophobizing agent is carried out at elevated temperature in a heatable treatment device, preferably in a heatable mixing device, wherein the coated or treated calcium carbonate containing material is removed from the device after cooling down, preferably cooling down to 50° C., preferably to room temperature (20° C.) or lower. It has been surprisingly found that the removal of the treated material after cooling within the device or mixer further improves the moisture pick-up susceptibility.

It may especially be preferred according to the present invention to thermally concentrate the moist calcium carbonate containing material in step c) at a temperature in the range of 50° C. to 200° C. in the presence of a hydrophobizing agent to a final moisture content of not more than 0.1 wt.-%, based on the weight of the calcium carbonate containing material.

The amount of hydrophobizing agent added to the calcium carbonate containing material may be in the range of 0.05 wt.-% to 2.0 wt.-%, based on the weight of the calcium carbonate containing material. Generally, when the water contact angle is greater than 90°, the surface is "hydrophobic" in the meaning of the present application. The contact angle may be measured according to the sessile drop method using a commercial video-based, software-controlled contact angle analyzer. Deionized and ultra-filtered water may be used for the measurements. A 5-µl water drop may be deposited on a horizontal substrate and after equilibrium the contact angles can be measured using a video-based software. Said horizontal substrate may be a tablet which is made with 11.5 g of the corresponding sample being pressed to a tablet, e.g. in an aluminium dish with a diameter of 40 mm and a height of 7 mm, using e.g. a TP40/20 press (Herzog) at 400 kN.

The inorganic particulate material being provided in step a) preferably has a weight median particle diameter $d_{50}$ value of from 0.1 to 5 µm, preferably from 0.1 to 2.5 µm, more preferably from 0.1 to 2.0 µm and most preferably from 0.3 to 1.8 µm, measured according to the sedimentation method.

According to another preferred embodiment of the invention, the mechanical means used for step b) include one or more of a centrifuge, a filtration device, a rotary vacuum filter, a filter press and/or tube press and/or wherein the thermal concentration of step c) is carried out with one or more of a spray dryer and a heat exchanger, jet dryer, oven, compartment drier, vacuum dryer, microwave dryer and/or freeze dryer.

According to another aspect of the present invention, the inventive method for making a calcium carbonate containing material is used for reducing the moisture sorption susceptibility of calcium carbonate containing materials.

The inventive calcium carbonate containing material obtainable by the inventive process described herein preferably has a moisture sorption susceptibility of less than 3.0 mg/g, preferably of less than 1.0 mg/g, even more preferably of less than 0.5 mg/g and most preferred of less than 0.3 mg/g.

According to yet another aspect of the present invention, the inventive method for making a calcium carbonate containing material is used for reducing the porosity of calcium carbonate containing materials. The inventive calcium carbonate containing materials with reduced porosity or pore volume are specifically suitable to be incorporated as filler into paper.

An especially preferred calcium carbonate material provided according to the present invention can be characterized as a particulate material having a weight median particle size $d_{50}$ value of 0.9 to 2.0 µm and having a moisture sorption susceptibility of less than 0.8 mg/g after treatment with a hydrophobizing agent. Furthermore, the calcium carbonate containing particulate material may have a total specific pore volume of less than 0.84 cm$^3$/g before treatment with said hydrophobizing agent. It is especially preferred that the calcium carbonate containing particulate material has a total specific pore volume of less than 0.47 cm$^3$/g in the pore diameter range of 0.004 to 2.4 μm before treatment with said hydrophobizing agent.

According to a preferred embodiment, the inventive calcium carbonate containing particulate material has a moisture sorption susceptibility of less than 0.6 mg/g, preferably of less than 0.5 mg/g and most preferred of less than 0.3 mg/g after treatment with a hydrophobizing agent. The total specific pore volume of the calcium carbonate containing particulate material preferably is less than 0.83 cm$^3$/g, preferably of less than 0.82 cm$^3$/g, more preferably of less than 0.81 cm$^3$/g and even more preferably of less than 0.80 cm$^3$/g before treatment with said hydrophobizing agent. For a pore diameter range of 0.004 to 2.4 μm, the total specific pore volume is preferably less than 0.46 cm$^3$/g, preferably less than 0.45 cm$^3$/g, more preferably less than 0.44 cm$^3$/g and even more preferably less than 0.40 cm$^3$/g before treatment with said hydrophobizing agent. The total specific pore volume in the pore diameter range of 0.004 to 2.4 μm describes the interparticle void volume of the particulate material, while the total specific pore volume over the whole pore diameter range (0.004 to 400 μm) describes the agglomerate void volume and the interparticle void volume of the particulate material. The total specific pore volume specified herein preferably is provided for a calcium carbonate containing particulate material having a weight median particle size $d_{50}$ value of 1.2 to 1.9 μm, preferably of 1.4 to 1.8 μm and more preferably of 1.6 to 1.8 μm.

According to another embodiment of the invention, the calcium carbonate containing material has a volume defined pore size polydispersity expressed as full width at half maximum (FWHM) of 0.9 μm or above, preferably in the range of 1.0 to 1.5 μm before treatment with said hydrophobizing agent.

According to a further aspect of the present invention, a thermoplastic polymer material is provided which comprises a thermoplastic polymer material, preferably a polyolefin film material, more preferably a breathable polyethylene film material, and the hydrophobically coated calcium carbonate containing material according to the present invention. The thermoplastic polymer material preferably comprises the calcium carbonate containing material in an amount of 1 to 60 wt.-%, preferably in an amount of 10 to 45 wt.-%, based on the thermoplastic polymer material.

According to yet another aspect of the present invention, a thermosetting polymer material is provided which comprises a thermosetting polymer material, preferably a thermosetting polymer selected from duroplastic polymers, epoxy resins, polyurethanes, elastomers, such as natural and/or synthetic rubber materials and polyesters, such as PET and the hydrophobically coated calcium carbonate containing material according to the present invention. The thermosetting polymer material according to the present invention comprises the calcium carbonate containing material preferably in an amount of 1 to 60 wt.-%, preferably in an amount of 2 to 25 wt.-%, based on the thermosetting polymer material.

In the following, the respective steps and corresponding preferred embodiments of the inventive process will be described in more detail. It is to be understood that these details and embodiments also apply to the calcium carbonate containing material itself as well as to the use of said product in any of the disclosed applications.

Process Step a)

According to process step a) a particulate moist calcium carbonate containing material is provided. In general, said calcium carbonate-containing material may be any calcium carbonate source and may be of natural or unnatural origin.

In some embodiments of the inventive process, the calcium carbonate-containing material provided in step a) is selected from natural calcium carbonate sources, preferably containing from 50 to 98 wt.-% of calcium carbonate, based on the total weight of said calcium carbonate-containing material.

According to one embodiment, the calcium carbonate-containing material contains at least 50 wt.-%, preferably at least 70 wt.-%, more preferably at least 80 wt.-%, even more preferably at least 90 wt.-%, and most preferably from 90 to 98 wt.-% of calcium carbonate, based on the total weight of said calcium carbonate-containing material.

According to another embodiment, the calcium carbonate-containing material provided in step a) is selected from the group consisting of marble, limestone, chalk, dolomite, and mixtures thereof.

According to a preferred embodiment, the calcium carbonate-containing material provided in step a) is selected from the group consisting of marble, limestone, chalk, and mixtures thereof. According to another preferred embodiment of the invention, the particulate moist calcium carbonate containing material of step a) is selected from the group consisting of wet ground calcium carbonate material, dry ground and wetted calcium carbonate material, precipitated calcium carbonate (PCC) material or a mixture of the foregoing calcium carbonate materials.

According to another preferred embodiment of the invention, the particulate moist calcium carbonate containing material is selected from the group consisting of wet ground calcium carbonate material, dry ground and wetted calcium carbonate material or a mixture of the foregoing calcium carbonate materials.

According to another preferred embodiment of the invention, the particulate moist calcium carbonate containing material provided in step a) has a weight median particle size diameter $d_{50}$ value of from 1 to 100 μm.

In cases where the calcium carbonate is of unnatural origin, the calcium carbonate-containing may be precipitated calcium carbonate (PCC). A PCC in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate, for example, in an aqueous environment. PCC may be vaterite, calcite or aragonite. PCCs are described, for example, in EP 2 447 213, EP 2 524 898, EP 2 371 766, or unpublished European patent application No 12 164 041.1.

Suitably, the calcium carbonate-containing material of step a) is provided in particulate moist form. According to the present invention this means that a low solids slurry or suspension is provided, said slurry or suspension having a moisture content of more than 65 wt.-%, based on the weight of the moist calcium carbonate containing material. This corresponds to a solids content of less than 35 wt.-%, based on the weight of the moist calcium carbonate containing material. In view of the foregoing, the inventive process is suitable for processing low solids calcium carbonate containing slurries or suspensions into a dry calcium carbonate containing material. The particulate moist calcium carbonate containing material provided in step a) according to a preferred embodiment of the present invention has a moisture content of more than 70 wt.-%, preferably of more than 75 wt.-% and more preferably of more than 80 wt.-%, based on the weight of the moist calcium carbonate containing material.

The calcium carbonate-containing material may be provided as a comminuted material, for example, in crushed, ground or pre-ground form. The inorganic particulate material being provided in step a) preferably has a weight median particle diameter $d_{50}$ value of from 0.1 to 5 µm, preferably from 0.1 to 2.5 µm, more preferably from 0.1 to 2.0 µm and most preferably from 0.3 to 1.8 µm, measured according to the sedimentation method described herein. Furthermore, the inorganic particulate material being provided in step a) preferably has a top cut $d_{98}$ of less than 10 µm, preferably of less than 5 µm. The residue of particles having a diameter of 45 µm or more, preferably of 20 µm or more, may alternatively or additionally be less than 3 ppm.

According to the present invention, the particulate moist calcium carbonate containing material contains no dispersant or a sub-effective amount of dispersant. A "sub-effective amount of dispersant" in the meaning of the present invention corresponds to an amount of dispersant which does not cause any measurable influence or change of the viscosity of the moist calcium carbonate containing material, i.e. the slurry containing the calcium carbonate solids. In other words, the viscosity of the moist calcium carbonate containing material containing a sub-effective amount of dispersant is substantially the same as in the complete absence of a dispersant. A sub-effective amount of dispersant typically is less than about 0.05 wt.-%, based on the dry calcium carbonate containing material, for example, less than about 0.02 wt.-%, less than about 0.01 wt.-%, based on the dry calcium carbonate containing material. A "dispersant" in the meaning of the present invention is, for example, a sodium poly(meta)acrylate, sodium polyphosphate and derivates and blends of the foregoing.

The moist calcium carbonate material provided in step a) according to the inventive method is subjected to the mechanical moisture reduction step b).

Process Step b)

According to process step b), the moisture content of the moist calcium carbonate containing material of step a) is reduced, wherein a part of the water soluble matter present in the particulate moist calcium carbonate containing material is removed. The moisture is removed according to step b) with mechanical means at a temperature in the range of between 0° C. to 65° C., preferably at a temperature in the range of more than 0° C. to 60° C., in one or more steps by at least 10% and in any case to a reduced moisture content of less than 65 wt.-%, based on the weight of the moist calcium carbonate containing material. As set out above in detail, it is required according to the inventive method that a moisture reduction of at least 10% is achieved and, additionally, that the reduced moisture content after step b) is less than 65 wt.-%, based on the weight of the moist calcium carbonate containing material. The moisture reduction with mechanical means may be carried out with well known techniques including filtration and centrifugation. Suitable mechanical techniques also include vacuum filtration, pressure filtration and the like. The corresponding mechanical means which may be used for step b) include one or more of a centrifuge, a filtration device, a rotary vacuum filter, a filter press and/or tube press.

The required reduction of the moisture content in step b) may be achieved in one step or in several steps, e.g. two, three or more steps. It may especially advantageous to use two or more steps if a more significant moisture reduction of e.g., at least 15%, at least 20%, at least 30%, at least 50%, at least 60% or at least 70%, based on the weight of aqueous phase of the moist calcium carbonate material should be achieved in step b). It may be preferred that the moisture content of the moist calcium carbonate containing material in step b) is lowered to a reduced moisture content of less than 60 wt.-%, based on the weight of the moist calcium carbonate containing material, preferably of less than 50 wt.-%, more preferably of less than 40 wt.-% and even more preferably of less than 30 wt.-%, based on the weight of the moist calcium carbonate containing material.

The preferred temperature range to be applied during step b) is determined by the processability of the moisture (water) on the one hand (more than 0° C. required) and, on the other hand, because of thermal instability of certain ions in the water phase, such as hydrogen carbonate, $HCO_3^-$.

The "water soluble matter" which is removed by e.g. filtering or centrifugation comprises ions. Consequently, the application of the mechanical moisture reduction or dewatering step to a specified extent or to minimum value leads to a change of the original ratio of ions in the water and solids in the water. By removing part of the ions and keeping the original solids content, the proportion or the percentage of the "water soluble matter" or the ions is lowered while the absolute amount of solids in the slurry essentially remains constant. As set out above, it was found by the inventors of the present invention that the ions or the water soluble matter being contained in the calcium carbonate suspension influence the properties of the final product. It is assumed that upon thermal concentrating the aqueous phase of the suspension, said ions and water-soluble matter undergo different physical-chemical processes on the surface of calcium carbonate particles. These processes may e.g. have an impact on the porosity of the dried particulate material and also influence the aggregation behavior of said particles due to e.g. less crystallization during the drying in the presence of less water soluble matter or ions.

In view of the foregoing observations, it becomes clear that step b) and the limits and or parameters defined therein are crucial for the inventive process and also for the properties of the product obtainable by said process.

Process Step c)

The inventive process further comprises drying step c). In said drying step, the moist calcium carbonate material with the reduced moisture content obtained in step b) is dried to obtain the calcium carbonate containing material to be produced.

During drying step c), the moist calcium carbonate containing material with the reduced moisture content of step b) is thermally concentrated at a temperature in the range of −100° C. to 100° C. until a final moisture content of not more than 1.0 wt.-%, based on the weight of the calcium carbonate containing material. If required or preferred the moisture may be removed until a total moisture content of less than or equal to 0.5 wt.-%, more preferably less than or equal to 0.2 wt.-%, and most preferably between 0.03 and 0.07 wt.-%, based on the total weight of the dried material. Typically, the moist calcium carbonate material with the reduced moisture content used for process step c) according to the present invention also contains no dispersant or a sub-effective amount of dispersant. In other words, no dispersant is usually added before the draying step c).

Typically, the drying step according to the inventive process may be carried out by any thermal drying method known to the skilled person. The drying step may be carried out with one or more of a spray dryer and a heat exchanger, jet dryer, oven, compartment drier, vacuum dryer, microwave dryer and/or freeze dryer.

According to one embodiment, drying step c) is a spray drying step, wherein said spray drying step is carried out at a temperature ranging from 90° C. to 130° C. and preferably from 100° C. to 120° C.

By means of drying step c), a dried mineral filler is obtained having a low total moisture content which is less than or equal to 1.0 wt.-%, based on the total weight of said dried mineral filler. According to another embodiment, the dried mineral filler of step c) has a total moisture content of less than or equal to 0.5 wt.-% and preferably less than or equal to 0.2 wt.-%, based on the total weight of said dried mineral filler. According to still another embodiment, the dried mineral filler of step e) has a total moisture content of between 0.01 and 0.15 wt.-%, preferably between 0.02 and 0.10 wt.-%, and more preferably between 0.03 and 0.07 wt.-%, based on the total weight of said dried mineral filler.

The dried mineral filler obtained in step c) according to one aspect of the present invention is a particulate material having a weight median particle size $d_{50}$ value of 0.9 to 2.0 µm and having a total specific pore volume of less than 0.84 cm$^3$/g. The total specific pore volume of the calcium carbonate containing particulate material obtained after the thermal drying step preferably is less than 0.83 cm$^3$/g, preferably of less than 0.82 cm$^3$/g, more preferably of less than 0.81 cm$^3$/g and even more preferably of less than 0.80 cm$^3$/g. The mineral filler material with a total specific pore volume of less than 0.84 cm$^3$/g preferably has a weight median particle size $d_{50}$ value of 1.2 to 1.9 µm, preferably of 1.4 to 1.8 µm and more preferably of 1.6 to 1.8 µm. The volume defined pore size polydispersity expressed as full width at half maximum (FWHM) of the calcium carbonate containing particulate material obtained after the thermal drying step is preferably 0.9 µm or above, and more preferably in the range of 1.0 to 1.5 µm.

According to one preferred embodiment of the invention, the calcium carbonate containing material is de-agglomerated during the drying process, preferably at the end of the drying process and/or during or after a subsequent hydrophobizing step as described herein.

Treatment with Hydrophobizing Agent

It is especially preferred according to the present invention that the calcium carbonate containing material obtained in step c) is treated with a hydrophobizing agent, preferably with a hydrophobizing agent selected from the group of mono- and/or dicarboxylic acids having from 6 to 24 chain carbon atoms, more preferably with at least one fatty acid selected from the group of stearic acid, behenic acid, palmitic acid, isostearic acid, montanic acid, capric acid, lauric acid, myristic acid and mixtures thereof and most preferably with caprylic acid and/or salts thereof. The treatment with the hydrophobizing agent is preferably carried out at elevated temperature such that the hydrophobizing agent is in the liquid or molten state and preferably is carried out at a temperature of at least 50° C., more preferably of at least 75° C., even more preferably of between 50° C. and 200° C. and most preferably of between 70° C. and 170° C. In some further embodiments of the inventive process, the temperature in the treatment step ranges from 70° C. to 140° C., preferably from 75° C. to 130° C., and more preferably from 80° C. to 125° C., depending on the choice of the hydrophobic coating material. Preferably, the hydrophobizing agent during the treatment step is in a molten, liquid form. According to the present invention, it may be preferred that the treatment with the hydrophobizing agent is carried out at the aforementioned elevated temperatures in a heatable treatment device, preferably in a heatable mixing device, wherein the coated or treated calcium carbonate containing material is removed from the device after cooling down, preferably cooling down to 50° C. and more preferably to room temperature (20° C.) or lower. It has been surprisingly found that the removal of the treated material after cooling within the device or mixer may further improve the moisture pick-up susceptibility.

It is contemplated according to the present invention that the treatment with the hydrophobizing agent preferably is carried out before, during and/or after de-agglomeration of the calcium carbonate containing material, most preferably during de-agglomeration. It may also be preferred according to the present invention to carry out two de-agglomeration steps, preferably prior and after the hydrophobic treatment. It was found that the moisture pickup susceptibility may be further improved by carrying out the de-agglomeration steps.

In some cases, the treatment step may be carried out directly at the end of the drying step. In one embodiment, drying step c) is thus carried out in a drying unit comprising a drying chamber and the hydrophobizing agent is contacted with the dried mineral filler by addition of said agent into the drying chamber.

It is assumed that shearing forces applied during the final phase of the drying process and/or during the application of the hydrophobizing agent promote the reduction of the total moisture content of the calcium carbonate containing material.

By means of said treatment step, a treatment layer is formed on at least part of the surface of the obtained calcium carbonate containing material. Said hydrophobizing agent used in the optional treatment step may be any agent known to the skilled person which is capable to form a hydrophobic treatment layer on at least part of the surface of a calcium carbonate containing material.

In one embodiment of the present invention, the hydrophobizing agent is selected from the group consisting of mono- and/or dicarboxylic acids having from 6 to 24 chain carbon atoms, mono-substituted succinic anhydrides, alkyl phosphoric acid esters, polyhydrogensiloxane, polydimethylsiloxane, and mixtures thereof.

According to another embodiment of the present invention, the hydrophobizing agent is a fatty acid having from 6 to 24 chain carbon atoms, preferably selected from the group consisting of stearic acid, behenic acid, palmitic acid, isostearic acid, montanic acid, capric acid, lauric acid, myristic acid, salts thereof, and mixtures thereof, and more preferably is stearic acid and/or a salt thereof.

According to another embodiment of the present invention, the hydrophobizing agent is an alkenyl succinic anhydride.

According to still another embodiment of the present invention, the hydrophobizing agent is an alkyl phosphoric acid ester.

According to still another embodiment of the present invention, the hydrophobizing agent is selected from polyhydrogensiloxane, polydimethylsiloxane, and mixtures thereof.

The amount of hydrophobizing agent added to the calcium carbonate containing material may be in the range of 0.05 wt.-% to 2.0 wt.-%, based on the weight of the calcium carbonate containing material.

By treatment with a hydrophobizing agent(s), a mineral filler is obtained which has a very low moisture susceptibility. More precisely, according to one aspect of the present invention, the inventive calcium carbonate containing particulate material has a moisture sorption susceptibility of less than 0.8 mg/g, preferably of less than 0.6 mg/g, more preferably of less than 0.5 mg/g and most preferred of less than 0.3 mg/g after treatment with a hydrophobizing agent.

The Calcium Carbonate Containing Material and its Use

The inventors surprisingly found that according to the inventive process, a calcium carbonate containing material is obtainable which, especially when treated with a hydrophobizing agent, provides a low moisture pick up as compared to conventional methods. Also the porosity and compressibility of the material of the dried calcium carbonate containing material can be adjusted or modified by the inventive process.

As already described above, the moisture pick up susceptibility of a material refers to the amount of moisture absorbed on the surface of said material and is expressed in mg moisture/g absorbed on a sample upon exposure to a defined humid atmosphere.

According to another aspect of the present invention, the inventive method for making a calcium carbonate containing material is used for reducing the moisture pick up or moisture sorption susceptibility of calcium carbonate containing materials.

The inventive calcium carbonate containing material obtainable by the inventive process described herein preferably has a moisture sorption susceptibility of less than 3.0 mg/g, preferably of less than 1 mg/g, even more preferably of less than 0.5 mg/g and most preferred of less than 0.3 mg/g.

In another embodiment, the calcium carbonate containing material obtainable by the optional treatment step may have a moisture pick up susceptibility of less than or equal to 3.0 mg/g, preferably of less than or equal to 2.5 mg/g, and most preferably less than or equal to 2.0 mg/g.

In another embodiment, the calcium carbonate containing material obtainable by the optional treatment step has a moisture pick up susceptibility of less than or equal to 0.9 mg/g, preferably less than or equal to 0.8 mg/g, more preferably less than or equal to 0.7 mg/g, and most preferably less than or equal to 0.6 mg/g.

In another embodiment of the present invention, the calcium carbonate containing material obtainable by the optional treatment step has a moisture pick up susceptibility of from 0.1 to 0.9 mg/g, preferably from 0.2 to 0.8 mg/g, and most preferably from 0.2 to 0.6 mg/g.

In some particular cases as, for example in case of high specific surface areas of the calcium carbonate containing material, the moisture pick up susceptibility may suitably be defined on the basis of the specific surface area of said product (referred to as the normalized moisture pick up susceptibility).

According to one embodiment of the present invention, said calcium carbonate containing material has a normalized moisture pick up susceptibility of less than or equal to 0.18 mg/m$^2$, preferably less than or equal to 0.17 mg/m$^2$, more preferably less than or equal to 0.16 mg/m$^2$, and most preferably less than or equal to 0.15 mg/m$^2$, based on the specific surface area of said product as measured by the BET nitrogen method.

According to another embodiment of the present invention, said calcium carbonate containing material has a normalized moisture pick up susceptibility of from 0.1 to 0.18 mg/m$^2$, preferably from 0.11 to 0.17 mg/m$^2$, and most preferably from 0.12 to 0.16 mg/m$^2$, based on the specific surface area of said product as measured by the BET nitrogen method.

According to another embodiment of the present invention, said calcium carbonate containing material has a specific surface area ranging from 0.1 to 20.0 m$^2$/g and more preferably from 3.0 to 14.0 m$^2$/g as measured by the BET nitrogen method.

By means of the inventive process, a low total volatiles content and, in particular, a high volatile onset temperature may be achieved.

In one embodiment, the calcium carbonate containing material according to the present invention may have a volatile onset temperature of at least or equal to 200° C., preferably at least or equal to 230° C., and more preferably at least or equal to 250° C. These values likewise refer to the dried calcium carbonate containing material of step c) of the inventive process and to the product obtainable by the optional treatment step with a hydrophobizing agent.

According to the present invention, it is contemplated that the dried and optionally hydrophobically treated calcium carbonate containing material obtainable by the inventive process is used as a filler, preferably as a filler in thermoplastic materials or thermosetting materials. According to the present invention, a thermoplastic polymer material is provided which comprises a thermoplastic polymer material, preferably a polyolefin film material, more preferably a breathable polyethylene film material, and the hydrophobically coated calcium carbonate containing material according to the present invention. The thermoplastic polymer material preferably comprises the calcium carbonate containing material in an amount of 1 to 60 wt.-%, preferably in an amount of 10 to 45 wt.-%, based on the thermoplastic polymer material. According to another embodiment of the present invention, a thermosetting polymer material is provided which comprises a thermosetting polymer material, preferably a thermosetting polymer selected from duroplastic polymers, epoxy resins, polyurethanes, elastomers, such as natural and/or synthetic rubber materials and polyesters, such as PET and the hydrophobically coated calcium carbonate containing material according to the present invention. The thermosetting polymer material according to the present invention comprises the calcium carbonate containing material preferably in an amount of 1 to 60 wt.-%, preferably in an amount of 2 to 25 wt.-%, based on the thermosetting polymer material.

The inventive calcium carbonate containing material may be used in a polymer composition, in paper making, paper coatings, agricultural applications, paints, adhesives, sealants, construction applications, and/or cosmetic applications, preferably said calcium carbonate containing material is used in a polymer composition.

As the calcium carbonate containing material has a low moisture pick up susceptibility, it may advantageously be used in paper coatings in order to adjust the printing properties of a coated paper. Furthermore, the calcium carbonate containing material may also be used in exterior paints and bathroom paints which may lead to a reduction in mildew growth on surfaces being treated with such paints. Furthermore, the low moisture sorption susceptibility improves the stability during storage of the corresponding filler material.

The use of the calcium carbonate containing material according to the present invention as a filler material in polymer applications may be of particular advantage. During processing of plastic materials containing fillers any moisture being added together with the filler to the plastic material may have unwanted effects as the moisture may evaporate during processing of the plastic material, e.g. during melt extrusion or melt blowing. In other words, a higher total moisture content of the filler material may affect the quality of the resulting plastic product. For example, said filler may be used in thermoplastic polymers, such as polyvinyl chloride, polyolefins, and polystyrene which may allow an increased filler load as compared to conventional calcium carbonate fillers.

Moreover, the calcium carbonate containing material may also be used in polymer coatings which may be applied on the surface of polymer articles, such as foils, in order to increase the hydrophobicity (e.g., reflected by an increased contact angle measured against water) of said surface.

According to another embodiment, the thermoplastic material is a polyolefin, polyvinylchloride, or polystyrene. Said polyolefin may be a polyethylene or polypropylene. According to still another embodiment, the polymeric material is polyvinylchloride or polystyrene.

Thermoplastic materials suitable for the present invention further comprise without being limited to:

a) Polymers from olefins and diolefins, for example, polyethylenes (LDPE, LLDPE, VLDPE, ULDPE, MDPE, HDPE, UHMWPE), polypropylene, polyisobutylene, poly-4-methyl-pentene-1, polybutadiene, polyisoprene, polycyclooctene, as well random or block copolymers, such as ethylene/but-1-ene copolymers, ethylene-hexene copolymers, ethylene-methylpentene copolymers, ethylene-octene copolymers, polypropylene-polyethylene (EP), EPM, EPDM, ethylene-vinylacetat (EVA), and ethylene-acrylic ester copolymers, b) Polystyrene, polymethylstyrene, styrene-butadiene copolymers (SB), styrene-butadiene-styrene (SBS) and its hydrogenated polymer (SEBS), Styrene-isoprene, styrene-isoprene-styrene (SIS), styrene-butadieneacrylnitrile (ABS), styrene-acrylnitrile-acrylate (ASA), styrene-maleic anhydride, and grafted polymers, for example, styrene-grafted butadiene, maleic acid anhydride-grafted SBS, or grafted polymers from methylmethacrylate, styrene-butadiene and ABS (MABS), c) Halogen containing polymers such as polyvinylchloride, polychloroprene, polyvinylidenchloride, chlorinated polyethylene, or polytetrafluoroethylene, d) Polymers from unsaturated esters such as polyacrylates, or polymethacrylates, for example, polymethylmethacrylate, polyacrylonitrile, polyacrylamide, polybutylacrylate, e) Polymers derived from unsaturated alcohols such as polyvinylalcohol, polyvinylacetate, or polyvinylbutyral (PVB), f) Polyacetales, for example, polyoxymethylene and copolymers thereof, g) Polyphenyleneoxide as well as polystyrene or polyamide blends thereof, h) Polyurethanes (PU), in particular linear polyurethanes (TPU), i) Polyamides (PA), such as PA-6, PA-6.6, PA-6.10, PA-4.6, PA-4.10, PA-6.12, PA-12.12, PA-11, PA-12 as well as partially aromatic polyamides (e.g. polyphthalamides), j) Polyimides, polyamidimides, polyetherimides, polyketones, polysulfones, polyethersulfones, and polyphenylensulfides, k) Polyethyleneterephthalate (PET), polybutyleneterephthalate (PBT), polypropyleneterephthalate, polyethylenenaphthylate, l) Polycarbonates, m) Cellulose derivatives, such as cellulose nitrate, cellulose acetate, or cellulose propionate, n) Partially or fully bio-based polymers derived from renewable biomass sources, such as vegetable fats and oils, corn starch, pea starch, or microbiota, aliphatic biopolyesters, such as polyhydroxyalkanoates (PHA), polyhydroxybutyrate (PHB), polyhydroxyvalerate (PHV), polyhydroxyhexanoate (PHH), or polyesters such as polylactic acid (PLA), o) Blends, mixtures, alloys and combinations comprising at least one of the above polymers.

According to one embodiment, the thermoplastic polymer is a polyolefin being selected from the group of homo- and/or copolymers of polyethylene, homo- and/or copolymers of polypropylene, homo- and/or copolymers of polybutylene, or mixtures thereof. It may be preferred that the thermoplastic polymer is selected from the group consisting of polyethylenes, polypropylenes, polybutylenes, or mixtures thereof, wherein the polymer material preferably is a polyethylene, for example a low density polyethylene (LDPE) and/or a linear low density polyethylene (LLDPE) and/or very low density polyethylene (VLDPE). The LDPE may have a density ranging from 0.910 to 0.940 g/cm$^3$, LLDPE may have a density ranging from 0.915 to 0.925 g/cm$^3$ and/or VLDPE may have a density ranging from 0.880 to 0.915 g/cm$^3$.

The polymer material of the present invention may be used in a number of processes including the manufacture of blown films, sheets, or pipe profiles, in processes such as extrusion of pipes, profiles, cables, fibers or the like, and in compression molding, injection molding, thermoforming, blow molding, rotational molding, etc.

In this respect, said polymer material may be directly used in the manufacture of polymer articles. Therefore, in one embodiment of the present invention, the polymer material (thermoplastic or thermosetting) comprises the calcium carbonate containing material in an amount of from 1 to 50 wt.-%, preferably of from 5 to 45 wt.-% and most preferably from 10 to 40 wt.-%, based on the total weight of the polymer material.

In an alternative embodiment, the thermoplastic polymer material may be used as a masterbatch.

The term "masterbatch" refers to a composition having a concentration of the calcium carbonate containing material that is higher than the concentration in the polymer material used for preparing the final application product. That is to say, the masterbatch is further diluted such as to obtain a polymer material which is suitable for preparing the final application product.

For example, a polymer material according to the present invention suitable to be used as a masterbatch comprises the calcium carbonate containing material in an amount of from 50 to 95 wt.-%, preferably from 60 to 95 wt.-%, and more preferably from 70 to 95 wt.-%, based on the total weight of the polymer material.

The polymer material or composition optionally may comprise one or more additives which are well known to the skilled person. Such additives comprise, without being limited to, UV-absorbers, light stabilizers, processing stabilizers, antioxidants, heat stabilizers, nucleating agents, metal deactivators, impact modifiers, plasticizers, lubricants, rheology modifiers, processing aids, pigments, dyes, optical brighteners, antimicrobials, antistatic agents, slip agents, anti-block agents, coupling agents, dispersants, compatibilizers, oxygen scavengers, acid scavengers, markers, anti-fogging agents, surface modifiers, flame retardants, blowing agents, smoke suppressors, reinforcement agents, such as glass fibres, carbon fibres and/or glass bubbles, or mixtures of the foregoing additives.

The polymer products or polymer compositions according to the present invention may be manufactured by any process known to the skilled person.

In the art, many methods for the manufacture of polymer products are known. These methods include, without being limited to, melt processing techniques, for example, profile extrusion (for pipes, sheets and hollow sheets), cable extrusion, film extrusion (forecast films and blown films), molding (e.g., injection molding, rotomolding, blow molding and thermoforming), fiber spinning (e.g., melt spinning, wet spinning, dry spinning and structural fibers), co-kneading and pultrusion. The final articles may provide mono-layer or multi-layer structures.

It is appreciated that filaments and/or fibres and/or threads according to the present invention may be prepared by all techniques known in the art used for preparing such filaments and/or fibres and/or threads. For example, the filaments and/or fibres and/or threads of the present invention can be prepared by the well-known melt-blown process, spunbonded process or staple fibre production.

In accordance with known technology such as the continuous filament spinning for yarn or staple fibre, and nonwoven processes such as spunbond production and meltblown production, the fibres and filaments can be formed by extrusion of the molten polymer through small orifices. In general, the fibres or filaments thus formed are then drawn or elongated to induce molecular orientation and affect crystallinity, resulting in a reduction in diameter and an improvement in physical properties.

Spunmelt is a generic term describing the manufacturing of nonwoven materials directly from thermoplastic polymer compositions. It encompasses 2 processes (spunlaid and meltblown) and the combination of both. In this process polymer granules are melted and molten polymer is extruded through a spinneret assembly which creates a plurality of continuous polymeric filaments. The filaments are then quenched and drawn, and collected to form a nonwoven web. Some remaining temperature can cause filaments to adhere to one another, but this cannot be regarded as the principal method of bonding. There are several methods available for forming the collected web of continuous filaments into a useful product by a bonding step, which includes, but is not be limited to calendering, hydroentangling, needling and/or bonding by means of chemicals or adhesives. Hydroentangling, also known as spunlacing, is a process which employs high pressure water jets to entangle fibres in a loose web thereby creating a fabric held together by frictional forces between the said fibres.

The spunlaid process (also known as spunbonded) has the advantage of giving nonwovens greater strength. Co-extrusion of second components is used in several spunlaid processes, usually to provide extra properties or bonding capabilities. In meltblown web formation, low viscosity polymers are extruded into a high velocity airstream on leaving the spinneret. This scatters the melt, solidifies it and breaks it up into a fibrous web.

It is known to those skilled in the art to combine processes or the fabrics from different processes to produce composite fabrics which possess certain desirable characteristics. Examples of this are combining spunbond and meltblown to produce a laminate fabric that is best known as SMS, meant to represent two outer layers of spunbond fabric and an inner layer of meltblown fabric. Additionally either or both of these processes may be combined in any arrangement with a staple fibre carding process or bonded fabrics resulting from a nonwoven staple fibre carding process. In such described laminate fabrics, the layers are generally at least partially consolidated by a bonding step.

Processes are well known in the art, and are commercially available, for producing spunbond fabrics. The two typical processes are known as the Lurgi process and the Reifenhauser process. The Lurgi process is based on the extrusion of molten polymer through spinneret orifices followed by the newly formed extruded filaments being quenched with air and drawn by suction through Venturi tubes. Subsequent to formation, the filaments are disbursed on a conveyor belt to form a nonwoven web. The Reifenhauser process differs from the Lurgi process in that the quenching area for the filaments is sealed, and the quenched air stream is accelerated, thus inducing more effective entrainment of the filaments into the air stream.

It is appreciated that films and/or breathable films according to the present invention may be prepared by all techniques known in the art used for preparing such films. For example, the films of the present invention can be prepared by the well-known techniques used for preparing stretched or oriented films, and preferably extrusion coating films, blown films, technical blown films, monotapes, cast films and the like.

The hydrophobically treated calcium carbonate containing particulate material according to the present invention may be used as a filler in the manufacture of a polymer product, preferably a polymer product being selected from a masterbatch, a fibre, preferably a staple fibre or carpet fibre, a filament, a thread, a woven material, a nonwoven material, a film, preferably a blown-film or a breathable film, a profile, a cable and a moulded product.

According to one embodiment of the present invention, the polymer composition or polymer product obtainable by the inventive process can advantageously be used for the preparation of various shaped articles for plastics applications. Examples include flexible packaging for industrial and consumer applications, including roll stocks, bags, pouches, labels, wraps, liddings, shrink sleeves and stretch films; rigid packaging for industrial and consumer applications including plastic bottles, cups and containers; building and construction materials, including pipes and conduits, cladding and profiles, insulations, seals and gaskets, geotextiles; agriculture and horticulture materials including greenhouse materials, mulch films, tunnel, silage, bale wraps, boxes and crates; transportation and automotive applications including interior parts, such as instrument and door panels, consoles, pillars and seating; exterior parts, such as bumper fascia, fenders, tailgates as well as under the hood applications including air ducts, air intake manifolds, radiators and cooling hoses; electrical and electronic applications including CD players, DVD systems, personal computers and TV sets, notebooks, tablets, smartphones, cookers, refrigerators and freezers, washing machines, dishwashers, tools and office equipment; medical and health applications including disposable caps, gowns, masks, scrub suits and shoe covers, drapes, wraps and packs, sponges, dressings and wipes, bed linen, contamination control gowns, examination gowns, lab coats, isolation gowns, diagnostic medical machinery and medical devices; personal care products including absorbent hygiene products (AHP), baby diapers, feminine hygiene products and adult incontinence products, wipes, skin care products, depilatory strips; household and furniture products, including wood composites, decorative foils, floor coverings, flooring, kitchen ware, cleaners, pet care, lawn and garden articles; toys, sports and leisure articles including playhouses, building kits, play vehicles, sports and fitness devices, shoes, clothing and sportswear, safety equipment (helmets, kneepads), sports equipment, and suitcases.

Finally, the inventive calcium carbonate material with reduced total porosity may advantageously be used as a filler in paper. In this context, it is indicated that a lower porosity of the filler material leads to an increased gloss and smoothness.

EXAMPLES

The scope and interest of the invention may be better understood on basis of the following examples which are intended to illustrate embodiments of the present invention. However, they are not to be construed to limit the scope of the claims in any manner whatsoever.

Particle Size Distribution

The weight median particle size $d_{50}$ as used herein is determined based on measurements made by using a Sedigraph™ 5100 instrument of Micromeritics Instrument Corporation. The method and the instrument are known to the skilled person and are commonly used to determine the particle size of fillers and pigments. The measurement is carried out in an aqueous solution of 0.1 wt.-% $Na_4P_2O_7$. The samples are dispersed using a high speed stirrer and supersonics. Hydrophobized samples have to be heated first at 400° C. for 5 hours in an oven to remove the hydrophobic coating.

BET Specific Surface Area of a Material

According to the present invention, the specific surface area (expressed in $m^2/g$) of a mineral filler is determined using the BET method (using nitrogen as adsorbing gas), which is well known to the skilled person (ISO 9277:1995). The total surface area (in $m^2$) of the mineral filler can be obtained by multiplication of the specific surface area (in $m^2/g$) and the mass (in g) of the mineral filler.

Moisture Pick Up Susceptibility

The moisture pick up susceptibility of a material according to the present invention may be determined in mg moisture/g after exposure to an atmosphere of 10 and 85% relative humidity, respectively, for 2.5 hours at a temperature of +23° C. (±2° C.). For this purpose, the sample is first kept at an atmosphere of 10% relative humidity for 2.5 hours, then the atmosphere is changed to 85% relative humidity at which the sample is kept for another 2.5 hours. The weight increase between 10 and 85% relative humidity is then used to calculate the moisture pick-up in mg moisture/g of sample. The moisture pick up susceptibility in mg/g divided by the specific surface area in $m^2$ (BET method) corresponds to the "normalized moisture pick up susceptibility" expressed in $mg/m^2$ of sample.

Total Moisture Content

The total moisture content of the filler is measured according to the Karl Fischer Coulometric titration method, desorbing the moisture in an oven at 220° C. for 10 min and passing it continuously into a KF coulometer (Mettler Toledo Coulometric KF Titrator C30, combined with Mettler oven DO 0337) using dry nitrogen at 100 ml/min for 10 min. A calibration curve using water has to be recorded and a blank of 10 min nitrogen flow without a sample has to be taken into account.

Porosimetry Testing

The porosity or pore volume is measured using a Micromeritics Autopore IV 9500 mercury porosimeter having a maximum applied pressure of mercury 414 MPa (60 000 psi). The equilibration time used at each pressure is 60 seconds. Approximately 0.3 g of sample material is sealed in a 5 $cm^3$ chamber powder penetrometer for analysis. The maximum applied pressure of mercury was 414 MPa, equivalent to a Laplace throat diameter of 0.004 µm. The data is corrected for mercury compression penetrometer expansion and sample material compression using a software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p1753-1764.). The porosity of the samples is measured in powder form, wherein the sample has a moisture content of not more than 1.0 wt.-%, based on the weight of the sample to be measured.

By taking the first derivative of the cumulative intrusion curves the pore size distributions based on equivalent Laplace diameter, inevitably including pore-shielding, was revealed. The FWHM is calculated from the pore size distribution curve.

Ash Content

The ash content test was performed by burning 5 to 30 g of the corresponding polymer composition at 570° C. for 120 minutes.

Filter Pressure Value (FPV)

The filter pressure test was performed on a commercially available Collin Pressure Filter Test Teach-Line FT-E20T-IS. The test method was performed in agreement with European Standard EN 13900-5 with each of the corresponding polymer compositions (16 g effective calcium carbonate per 200 g of final sample, diluent: LLDPE ExxonMobil LL 1001 VX) using a 14 µm type 30 filter (GKD Gebr. Kufferath A G, Düren, Germany), wherein no melt pump was used, the extruder speed was kept at 100 rpm, and wherein the melt temperature was 225 to 230° C. (temperature setting: 190° C./210° C./230° C./230° C./230° C.).

Extrusion Simulation

The extrusion simulation was developed to evaluate the mineral dispersion in a polymer composition. The test equipment and conditions are the same as for the filterpressure value test. Each of the corresponding polymer composition (215 g effective calcium carbonate per 400 g of final sample, diluent: LLDPE ExxonMobil LL 1001 VX) was measured using a 25 µm type 30 filter (GKD Gebr. Kufferath AG, Düren, Germany). The results are expressed in bar and can be calculated by subtracting the final melt pressure (determined after 5 min of purging with pure polymer material) from the initial pressure of the polymer composition.

Visual Evaluation of the Breathable Film

The evaluation is done visually during the processing of the visual film without any auxiliary means for enlargement, "ok" means that no holes, no pinholes, and no stripes are observed.

Water Vapour Transmission Rate (WVTR)

The WVTR value of the breathable films was measured with a Lyssy L80-5000 (PBI-Dansensor A/S, Denmark) measuring device according to ASTM E398.

Hydrostatic Pressure Test

The hydrostatic pressure test has been carried out according to a procedure which is equivalent to AATCC Test Method 127-2013, WSP 80.6 and ISO 811. A film sample (test area=10 $cm^2$) was mounted to form a cover on the test head reservoir. This film sample was subjected to a standardized water pressure, increased at a constant rate until leakage appears on the outer surface of the film, or water burst occurs as a result of film failure (pressure rate gradient=100 mbar/min.). Water pressure was measured as the hydrostatic head height reached at the first sign of leakage in three separate areas of the film sample or when burst occurs. The head height results were recorded in centimetres or millibars of water pressure on the specimen. A higher value indicated greater resistance to water penetration. The TEXTEST FX-3000, Hydrostatic Head Tester (Textest AG, Switzerland), was used for the hydrostatic pressure measurements.

Tests n°1, n°2 and n°3
Materials
Marble Used as Starting Material ("Marble")

Marble of the region of Carrara, Italy, comprising 99.6 wt.-% $CaCO_3$, 0.35 wt.-% silicates and 0.05 wt.-% of pyrite was used as starting material. The weight median particle size $d_{50}$ was about 45 μm (measured by screens). The BET surface was less than 1.0 $m^2/g$.

Marble Obtained after Grinding ("Marble Slurry")

The "marble slurry" as used for the tests described hereinafter was produced by wet grinding the above-specified "marble" at a moisture content of 80 wt.-% solids, based on the weight of moist calcium carbonate, in tap water (20° dH) in the absence of any dispersant in a stirred pearl mill (1-3 mm pearls composed of zircon dioxide) with a grinding volume of 4.5 $m^3$. The obtained "marble slurry" contained calcium carbonate material having a weight median diameter $d_{50}$ of 1.7 μm ($d_{98}$ of 8.5 μm, $d_{80}$ 2.6 μm, $d_{20}$ 0.5 μm). The BET surface was measured to be 3.8 $m^2/g$. The temperature during grinding raised from 22° C.±2° C. at the inlet of the grinder to 56° C.±5° C. at the outlet of the grinder. The final moisture content of the "marble slurry" obtained after grinding was 79.6 wt.-%.

Test n°4
Starting Material

The "starting material" as used for this test described hereinafter was produced by wet grinding Carrara marble having a weight median diameter $d_{50}$ of 8.63 μm at a moisture content of 80 wt.-% solids, based on the weight of moist calcium carbonate, in tap water (20° dH) in the absence of any dispersant in a dynomill (0.6-1.0 mm Verac beads). The obtained "starting material" contained calcium carbonate material having a weight median diameter $d_{50}$ of 0.7 μm, a $d_{75}$ diameter value of less than 1 μm, and a BET specific surface of 7.0 $m^2/g$.

Test n°5
Starting Material

The "starting material" as used for this test described hereinafter was produced by wet grinding Omey limestone at a moisture content of 80 wt.-% solids, based on the weight of moist calcium carbonate, in tap water (20° dH). The obtained "starting material" contained calcium carbonate material having a weight median diameter $d_{50}$ of 1.8 μm, and a BET specific surface of 3.1 $m^2/g$.

Tests
Test n°1 (Invention)

The "marble slurry" having a moisture content of 79.6 wt.-%, based on the weight of the moist calcium carbonate material, was first mechanically concentrated to 50 wt.-% moisture by using a centrifuge. In a second step, the mechanically concentrated moist calcium carbonate material content was thermally concentrated to 0.11 wt.-% residual moisture content using a Niro spray drier. By the corresponding process a powder (test n°1) was obtained.

In order to produce a hydrophobically treated product, 500 g of the spray dried powder (test n°1) were added to an MTI Mixer and the sample was heated for 5 minutes at 120° C. and 3000 rpm. Thereafter, 0.85 wt.-%, based on the weight of the spray dried powder (test n°1), of a blend of palmitic acid and stearic acid (molar 2:1) was introduced to the mixer (treatment A) or 0.5 wt.-%, based on the weight of the spray dried powder (test n°1), of caprylic acid, (octanoic acid (product number O0040, commercially available from TCI Europe N.V, Belgium) was introduced to the mixer (treatment B) or 0.7 wt.-%, based on the weight of the spray dried powder (test n°1), of alkenyl succinic anhydride (CAS [68784-12-3], concentration >93%) was introduced to the mixer (treatment C). The contents of the mixer were mixed at 120° C. under a stirring speed of 3000 rpm for a period of 5 minutes.

Test n°2 (Comparative)

The "marble slurry" having a moisture content of 79.6 wt.-%, based on the weight of the moist calcium carbonate material, was first mechanically adjusted to 65 wt.-% moisture by using a centrifuge. In a second step, the mechanically concentrated moist calcium carbonate material content was thermally concentrated to 0.09 wt.-% residual moisture content using a Niro spray drier. By the corresponding process a powder (test n°2) was obtained.

In order to produce a hydrophobically treated product, 500 g of the spray dried powder (test n°2) were added to an MTI Mixer and the sample was heated for 5 minutes at 120° C. and 3000 rpm. Thereafter, 0.85 wt.-%, based on the weight of the spray dried powder (test n°2), of a blend of palmitic acid and stearic acid (molar 2:1) was introduced to the mixer (treatment A) or 0.5 wt.-%, based on the weight of the spray dried powder (test n°2), of caprylic acid, (octanoic acid (product number 00040, commercially available from TCI Europe N.V, Belgium) was introduced to the mixer (treatment B) or 0.7 wt.-%, based on the weight of the spray dried powder (test n°2), of alkenyl succinic anhydride (CAS [68784-12-3], concentration >93%) was introduced to the mixer (treatment C). The contents of the mixer were mixed at 120° C. under a stirring speed of 3000 rpm for a period of 5 minutes.

Test n°3 (Comparative)

The "marble slurry" having a moisture content of 79.6 wt.-%, based on the weight of the moist calcium carbonate material, was thermally concentrated to 0.09 wt.-% residual moisture content using a Niro spray drier. By the corresponding process a powder (test n°3) was obtained.

In order to produce a hydrophobically treated product, 500 g of the spray dried powder (test n°3) were added to an MTI Mixer and the sample was heated for 5 minutes at 120° C. and 3000 rpm. Thereafter, 0.85 wt.-%, based on the weight of the spray dried powder (test n°3), of a blend of palmitic acid and stearic acid (molar 2:1) was introduced to the mixer (treatment A) or 0.5 wt.-%, based on the weight of the spray dried powder (test n°3), of caprylic acid, (octanoic acid (product number O0040, commercially available from TCI Europe N.V, Belgium) was introduced to the mixer (treatment B) or 0.7 wt.-%, based on the weight of the spray dried powder (test n°3), of alkenyl succinic anhydride (CAS [68784-12-3], concentration >93%) was introduced to the mixer (treatment C). The contents of the mixer were mixed at 120° C. under a stirring speed of 3000 rpm for a period of 5 minutes.

Results

The total specific pore volume as well as the volume defined pore size polydispersity expressed as full width at half maximum (FWHM) of the respective products resulting from test n°1, test n°2 and test n°3 prior to the treatment with the hydrophobizing agent was determined and is shown in table 1 below.

TABLE 1 comparison of total pore volume and the volume defined pore size poly dispersity expressed as full width at half maximum (FWHM) for "Treatment A"

|  | Test no3 | Test no2 | Test no1 |
|---|---|---|---|
| Moisture content before thermal treatment [wt.-%] | 80 | 65 | 50 |
| *Total specific pore volume of untreated powder [cm³/g] | 0.918 | 0.844 | 0.794 |
| **Total specific pore volume of untreated powder [cm³/g] | 0.496 | 0.473 | 0.458 |
| Volume defined pore size polydispersity expressed as full width at half maximum (FWHM) [µm] | 0.79 | 0.90 | 1.16 |

*Total specific pore volume of untreated powder for the pore diameter range of 0.004 to 400.0 µm
**Total specific pore volume of untreated powder for the pore diameter range of 0.004 to 2.4 µm The moisture pick-up susceptibility of the respective products resulting from test n°1, test n°2 and test n°3 after the treatment with the hydrophobizing agent was determined and is shown in table 2 below.

TABLE 2 comparison of moisture pick up susceptibility

|  | Test no3 | Test no2 | Test no1 |
|---|---|---|---|
| Moisture content before thermal treatment [wt.-%] | 80 | 65 | 50 |
| Moisture pick up susceptibility of hydrophobically treated powder [mg/g CaCO₃] Treatment A | 0.9753 | 0.4853 | 0.3796 |
| Moisture pick up susceptibility of hydrophobically treated powder [mg/g CaCO3] - Treatment B | 0.7011 | 0.6248 | 0.5051 |
| Moisture pick up susceptibility of hydrophobically treated powder [mg/g CaCO3] - Treatment C | 0.7592 | 0.6300 | 0.5323 |

In order to demonstrate the correlation between concentration of water soluble matter or ions in the aqueous phase and the moisture sorption properties of the dried product, several experiments were carried out. During these experiments the moisture susceptibility of a calcium carbonate containing material being obtained by thermally drying a low solids slurry (comparative) and being obtained by the inventive two-step process were compared. The results obtained by the corresponding tests appear to clearly support the surprising finding of the inventors, namely that the specific two-step process as claimed herein leads to different products having improved properties, especially a reduced total pore volume and a reduced moisture pick-susceptibility. The obtained results are also reflected by FIGS. 1 and 2 showing the total pore volume of test n°1, test n°2 and test n°3 (FIG. 1) as well as the pore volume distribution of said tests (FIG. 2).

Test n°4 (Invention)

The "starting material" having a moisture content of 80 wt.-%, based on the weight of the moist calcium carbonate material, was first mechanically concentrated to 37 wt.-% moisture by using a press filter equipment (at 2 to 2.5 bar). In a second step, the mechanically concentrated moist calcium carbonate material content was thermally dried to 0.1 wt.-% residual moisture content using a drying oven at a temperature of 160° C. The resulting dried product was then de-agglomerated in a centrifugal mill ZM200 (sieve 0.2 mm trapezoid holes).

In order to produce a hydrophobically treated product, 1 136 g of the dried and pre-heated product (overnight in an oven at 160° C.) was added to a Lödige Mixer L5, that was pre-heated to 150° C. The sample was mixed for 5 minutes at a temperature of 108° C. and a speed of 980 rpm. Thereafter, 1.66 wt.-%, based on the weight of the dried product, of a blend of palmitic acid and stearic acid (molar 2:1) was introduced to the mixer. The contents of the mixer were mixed at 108° C. at a stirring speed of 980 rpm for a period of 30 minutes. After that, the product was allowed to cool down in the mixer before removing it. After another de-agglomeration step in a centrifugal mill ZM200 (sieve 0.2 mm trapezoid holes), a moisture pick up susceptibility of the hydrophobically treated powder of 0.2228 mg/g calcium carbonate was measured.

Test n°5 (Invention)

The "starting material" having a moisture content of 80 wt.-%, based on the weight of the moist calcium carbonate material, was first mechanically concentrated to 50 wt.-% moisture by using a centrifuge. In a second step, the mechanically concentrated moist calcium carbonate material content was thermally dried to 0.1 wt.-% residual moisture content using a spray drier.

In order to produce a hydrophobically treated product, 1 670 g of the dried product was pre-heated overnight in an oven at 160° C. Then the dried and pre-heated was added to a Lödige Mixer L5, that was pre-heated to a temperature of 160° C. The sample was mixed for 5 minutes at a temperature of 160° C. and a speed of 980 rpm. Thereafter, 0.73 wt.-%, based on the weight of the dried product, of a blend of palmitic acid and stearic acid (molar 2:1) was introduced to the mixer. The contents of the mixer were mixed at 160° C. at a stirring speed of 980 rpm for a period of 30 minutes. After that, the product was allowed to cool down in the mixer to the temperatures given in below Table 3 before removing it. Table 3 also lists the moisture pick up susceptibility of the hydrophobically treated powders.

TABLE 3

Cooling down temperatures and moisture pick up susceptibility of the respective products

| Cooling down temperature of sample after treatment at 160° C. | moisture pick up susceptibility in [mg/g] |
|---|---|
| 100° C. | 0.4423 |
| 80° C. | 0.3901 |
| 50° C. | 0.3481 |
| 20° C. | 0.1715 |

Polymer Products
Materials
Dried Calcium Carbonate (CC) Materials

CC1 (comparative): Natural ground calcium carbonate, commercially available from Omya International AG, Switzerland ($d_{50}$: 1.7 µm; $d_{98}$: 6 µm), surface-treated with 1 wt.-% stearic acid (commercially available from Sigma-Aldrich, Croda, USA) based on the total weight of the ground calcium carbonate.

CC2 (inventive): Natural ground calcium carbonate, produced according to Test no 1, surface-treated with Treatment B CC3 (comparative): Natural ground calcium carbonate, produced according to Test no 3, surface-treated with Treatment B CC4 (inventive): Natural ground calcium carbonate, produced according to Test no 1, wherein the surface-treatment was carried out with 1 wt.-%, based on the weight of the spray dried powder (test n°1) of 1 wt.-% stearic acid (commercially available from Sigma-Aldrich, Croda, USA) based on the total weight of the ground calcium carbonate CC5 (inventive): Natural ground calcium carbonate, produced according to Test no 1, surface-treated with Treatment C CC6 (comparative): Natural ground calcium carbonate, produced according to Test no 2, surface-treated with Treatment C Thermoplastic Polymers P1: LLDPE LL 6101XR (MFR: 20 g/10 min (190° C., 2.16 kg), density: 0.924 g/cm³ according to technical data sheet), commercially available from ExxonMobil Chemical, USA.

P2: LLDPE Dowlex 2035 (MFR: 6 g/10 min (190° C., 2.16 kg), density: 0.919 g/cm³ according to technical data sheet), commercially available from The Dow Chemical Company, USA.

P3: LDPE Dow SC 7641 (MFR: 2 g/10 min (190° C., 2.16 kg), density: 0.923 g/cm³ according to technical data sheet), commercially available from The Dow Chemical Company, USA.

Application in Polymers

Example 1: Preparation of Masterbatches in Polyethylene for Blown Films

Masterbatches containing 25 wt.-% LLDPE LL 6101XR (Exxon Mobil), and 75 wt.-% CC2 or CC3 were prepared on a Buss kneader (PR 46 from Buss AG, Switzerland). The compositions and filler contents of the prepared masterbatches are compiled in Table 4 below. The precise filler content was determined by the ash content. Furthermore, a filter pressure test and the extrusion simulation test were carried out in order to determine the dispersion quality of the filler material product.

TABLE 4

Compositions and properties of prepared masterbatches.

| Masterbatch | Filler | Ash content [wt.-%] | FPV at 14 µm [bar/g] | Extrusion simulation [bar] |
|---|---|---|---|---|
| MB2 (inventive) | CC2 | 71.0 | 0.58 | 11.1 |
| MB4 (comparative) | CC3 | 73.3 | 0.58 | 17.1 |

The results shown in Table 4 confirm that masterbatches with good quality were produced.

Example 2: Preparation of Polyolefin Compounds for Breathable Films

Compounds containing 45 wt.-% P2, 5 wt.-% P3, and 50 wt.-% CC4 or CC5 or CC6, respectively, were continuously prepared on Buss kneader (PR46 from Buss AG, Switzerland). The compositions and filler contents of the prepared compounds are compiled in Table 5 below. The precise filler content was determined by the ash content.

TABLE 5

Compounds for breathable film

| Compound | Filler | Ash content [wt.-%] |
|---|---|---|
| CO1 (inventive) | CC4 | 49.8 |
| CO2 (inventive) | CC5 | 49.8 |
| CO3 (comparative) | CC6 | 50.2 |

Example 3: Preparation of Breathable Films

Breathable films were produced by a pilot-extrusion cast-film line with integrated MDO-II unit (Dr. Collin GmbH, Germany) the extruder temperature settings were 195° C.-210° C.-230° C.-230° C., and the rotation speed of the extruder was approximately 35 rpm using the compounds of Example 3. The roller speed of the stretching unit was 130/130%.

The film quality of the obtained breathable films was inspected visually and the films were tested regarding their water vapour transmission rate (WVTR) and their hydrostatic pressure. The results are shown in Table 6 below.

TABLE 6

Compositions and properties of prepared breathable films.

| Sample | Compound | Film quality | WVTR [g/m² × day] | Hydrostatic pressure [mbar] |
|---|---|---|---|---|
| 2 (inventive) | CO1 | ok | 3750 | 393 |
| 3 (inventive) | CO2 | ok | 3812 | 388 |
| 5 (comparative) | CO3 | ok | 3650 | 343 |

The results shown in Table 6 confirm that the inventive breathable films provide excellent quality and breathability.

We claim:

1. A calcium carbonate and hydrophobizing agent containing material obtainable by a process comprising the following steps:
   a) providing a particulate moist calcium carbonate containing material, said material
      i) having a moisture content of more than 65 wt.-%, based on the weight of the moist calcium carbonate containing material, and
      ii) containing no dispersant or containing a sub-effective amount of dispersant;
   b) reducing the moisture content of the moist calcium carbonate containing material of step a), thereby removing a part of the water soluble matter present in the particulate moist calcium carbonate containing material, wherein the moisture is removed with mechanical means at a temperature in the range of more than 0° C. to 65° C. in one or more steps by at least 10% and in any case to a reduced moisture content of less than 65 wt.-%, based on the weight of the moist calcium carbonate containing material;

c) thermally concentrating the moist calcium carbonate containing material with the reduced moisture content of step b) at a temperature in the range of −100° C. to 100° C. until a final moisture content of not more than 1.0 wt.-%, based on the weight of the calcium carbonate containing material; and treating the calcium carbonate containing material obtained in step c) with a hydrophobizing agent selected from the group consisting of stearic acid, behenic acid, palmitic acid, isostearic acid, montanic acid, capric acid, lauric acid, myristic acid, and mixtures thereof, wherein the calcium carbonate and hydrophobizing agent containing material has a moisture sorption susceptibility of less than 0.5 mg/g.

2. A calcium carbonate and hydrophobizing agent containing material obtainable by a process according to claim 1, wherein the calcium carbonate containing material has a moisture sorption susceptibility of less than 0.3 mg/g.

3. A calcium carbonate containing particulate material, wherein the calcium carbonate containing material has a moisture sorption susceptibility of less than 0.5 mg/g after treatment with a hydrophobizing agent selected from the group consisting of stearic acid, behenic acid, palmitic acid, isostearic acid, montanic acid, capric acid, lauric acid, myristic acid, and mixtures thereof.

4. A calcium carbonate containing particulate material having a weight median particle size $d_{50}$ value in the range of 0.9 to 2.0 μm, wherein the calcium carbonate containing material has a moisture sorption susceptibility of less than 0.5 mg/g after treatment with a hydrophobizing agent selected from the group consisting of stearic acid, behenic acid, palmitic acid, isostearic acid, montanic acid, capric acid, lauric acid, myristic acid, and mixtures thereof, and wherein the calcium carbonate containing material has a total specific pore volume of less than 0.47 cm$^3$/g in the pore diameter range of 0.004 to 2.4 μm before treatment with said hydrophobizing agent.

5. A calcium carbonate and hydrophobizing agent containing material according to claim 2, wherein the calcium carbonate containing material has a total specific pore volume of less than 0.83 cm$^3$/g before treatment with said hydrophobizing agent.

6. A calcium carbonate and hydrophobizing agent containing material according to claim 2, wherein the calcium carbonate and hydrophobizing agent containing material has a total specific pore volume of less than 0.46 cm$^3$/g in the pore diameter range of 0.004 to 2.4 μm before treatment with said hydrophobizing agent.

7. A calcium carbonate and hydrophobizing agent containing material according to claim 2, wherein the calcium carbonate and hydrophobizing agent containing material has a volume defined pore size polydispersity expressed as full width at half maximum (FWHM) of 0.9 μm or above before treatment with said hydrophobizing agent.

8. A calcium carbonate and hydrophobizing agent containing material according to claim 1, wherein the calcium carbonate and hydrophobizing agent containing material has a weight median particle size $d_{50}$ value of 1.2 to 1.9 μm.

9. A process of using a calcium carbonate and hydrophobizing agent containing material according to claim 1 as a filler, comprising adding said calcium carbonate and hydrophobizing agent containing particulate material to a composition used in polymer compositions, paper making, paper coatings, agricultural applications, paints, adhesives, sealants, construction applications and/or cosmetic applications.

10. A process of using a calcium carbonate and hydrophobizing agent containing material according to claim 2 as a filler, comprising adding said calcium carbonate and hydrophobizing agent containing particulate material to a composition used in the manufacture of a polymer product.

11. A process for producing a polymer product, wherein a calcium carbonate and hydrophobizing agent containing material according to claim 2 is added to at least one polymer.

12. The process of claim 11 wherein the at least one polymer is a thermoplastic polymer selected from the group consisting of homopolymers and/or copolymers of polyolefins, polyamides, polystyrenes, polyacrylates, polyvinyls, polyurethanes, halogen-containing polymers, polyesters, polycarbonates, and mixtures thereof.

13. A calcium carbonate containing particulate material according to claim 3, wherein the calcium carbonate containing material has a moisture sorption susceptibility of less than 0.3 mg/g after treatment with a hydrophobizing agent.

14. A calcium carbonate containing particulate material according to claim 4, wherein the calcium carbonate containing material has a moisture sorption susceptibility of less 0.3 mg/g after treatment with a hydrophobizing agent.

15. A calcium carbonate and hydrophobizing agent containing material according to claim 2, wherein the calcium carbonate containing material has a total specific pore volume of less than 0.83 cm$^3$/g before treatment with said hydrophobizing agent.

16. A calcium carbonate containing particulate material according to claim 3, wherein the calcium carbonate containing material has a total specific pore volume of less than 0.83 cm$^3$/g before treatment with said hydrophobizing agent.

17. A calcium carbonate containing particulate material according to claim 4, wherein the calcium carbonate containing material has a total specific pore volume of less than 0.83 cm$^3$/g before treatment with said hydrophobizing agent.

18. A calcium carbonate and hydrophobizing agent containing material according to claim 2, wherein the calcium carbonate and hydrophobizing agent containing material has a total specific pore volume of less than 0.46 cm$^3$/g in the pore diameter range of 0.004 to 2.4 μm before treatment with said hydrophobizing agent.

19. A calcium carbonate containing particulate material according to claim 3, wherein the calcium carbonate containing material has a total specific pore volume of less than 0.46 cm$^3$/g in the pore diameter range of 0.004 to 2.4 μm before treatment with said hydrophobizing agent.

20. A calcium carbonate containing particulate material according to claim 4, wherein the calcium carbonate containing material has a total specific pore volume of less than 0.46 cm$^3$/g in the pore diameter range of 0.004 to 2.4 μm before treatment with said hydrophobizing agent.

21. A calcium carbonate and hydrophobizing agent containing material according to claim 2, wherein the calcium carbonate and hydrophobizing agent containing material has a volume defined pore size polydispersity expressed as full width at half maximum (FWHM) of 0.9 μm or above, before treatment with said hydrophobizing agent.

22. A calcium carbonate containing particulate material according to claim 3, wherein the calcium carbonate containing material has a volume defined pore size polydispersity expressed as full width at half maximum (FWHM) of 0.9 μm or above, before treatment with said hydrophobizing agent.

23. A calcium carbonate containing particulate material according to claim 4, wherein the calcium carbonate containing material has a volume defined pore size polydispersity expressed as full width at half maximum (FWHM) of 0.9 µm or above, before treatment with said hydrophobizing agent.

24. The calcium carbonate containing particulate material according to claim 3, wherein said calcium carbonate containing particulate material has a total specific pore volume of less than 0.84 $cm^3/g$ before treatment with said hydrophobizing agent.

* * * * *